(12) United States Patent
Fukakusa et al.

(10) Patent No.: US 7,889,620 B2
(45) Date of Patent: Feb. 15, 2011

(54) OPTICAL PICKUP DEVICE AND OPTICAL DISK DEVICE

(75) Inventors: Masaharu Fukakusa, Miyazaki (JP); Hideki Yoshinaka, Fukuoka (JP); Mayumi Tsukamoto, Nagasaki (JP); Satoshi Nagata, Fukuoka (JP); Eizo Ono, Kumamoto (JP)

(73) Assignee: Panasonic Corporation, Osaka (JP)

( * ) Notice: Subject to any disclaimer, the term of this patent is extended or adjusted under 35 U.S.C. 154(b) by 278 days.

(21) Appl. No.: 12/187,900

(22) Filed: Aug. 7, 2008

(65) Prior Publication Data

US 2009/0040910 A1  Feb. 12, 2009

(30) Foreign Application Priority Data

Aug. 8, 2007  (JP)  ............................ 2007-206579

(51) Int. Cl.
    *G11B 7/00* (2006.01)
(52) U.S. Cl. ............................ 369/112.19; 369/112.23; 369/53.23
(58) Field of Classification Search ............ 369/112.29, 369/112.23, 53.23
    See application file for complete search history.

(56) References Cited

U.S. PATENT DOCUMENTS

| | | | |
|---|---|---|---|
| 5,475,670 A | 12/1995 | Hamada et al. | |
| 7,301,882 B2 * | 11/2007 | Itonaga | 369/112.23 |
| 7,315,503 B2 * | 1/2008 | Cho et al. | 369/112.29 |
| 7,738,347 B2 * | 6/2010 | Tsukamoto et al. | 369/112.23 |
| 2008/0062827 A1 | 3/2008 | Tsukamoto | |
| 2009/0040893 A1 * | 2/2009 | Yoshinaka et al. | 369/53.23 |

FOREIGN PATENT DOCUMENTS

| | | | |
|---|---|---|---|
| JP | 63-259101 A | 10/1988 | |
| JP | 2008-90990 A | 4/2008 | |

* cited by examiner

*Primary Examiner*—Aristotelis Psitos
(74) *Attorney, Agent, or Firm*—Panasonic Patent Center; Dhiren Odedra; Kerry Culpepper

(57) ABSTRACT

A light source emits light with a first wavelength and light with a second wavelength longer than the first wavelength toward an optical disk from adjacent positions. An optical receiver detects light reflected from the optical disk. An astigmatism-generating element generates light used for focus control in a condition where a focusing position on one of two perpendicular cross sections including an optical axis of the light reflected from the optical disk is located ahead of the optical receiver and a focusing position on the other cross section is located behind the optical receiver are included. The astigmatism-generating element is a Fresnel mirror configured to include a plurality of reflecting mirrors. A level difference between the reflecting mirrors adjacent to each other is distributed in a range from a depth of substantially (natural number/2) times the first wavelength to (natural number/2) times the second wavelength.

15 Claims, 16 Drawing Sheets

------▶ : LASER BEAM FOR DVD
─── ▶ : LASER BEAM FOR CD

------- : LASER BEAM FOR DVD
—·—·— : LASER BEAM FOR CD

------→ : LASER BEAM FOR DVD

------→ : LASER BEAM FOR CD

OPTICAL DISK IS NEAR

OPTICAL DISK IS FAR

OPTICAL PICKUP DEVICE AND OPTICAL DISK DEVICE

BACKGROUND

1. Technical Field

The technical field relates to an optical pickup device and an optical disk device mounted in an electronic apparatus, such as a personal computer or a notebook computer.

2. Description of the Related Art

As electronic apparatuses, such as personal computers and notebook computers, have become smaller, optical pickup devices and optical disk devices mounted therein have also become smaller.

FIG. 14 is a view illustrating the configuration of main parts in an optical system of a known optical pickup device. A light source 101 emits a laser beam for a Digital Versatile Disk or Digital Video Disk (hereafter "DVD") having a wavelength λ1 of about 650 nm and a laser beam for a compact disk (hereafter: "CD") having a wavelength λ2 of about 780 nm toward an optical disk 104. A prism 102 is formed of optical glass, for example, and has a slope where a beam splitter 103 is formed inside the prism 102. The beam splitter 103 is formed by using a polarization separating film and has a property of transmitting a laser beam, which is emitted from the light source 101 and moves toward the optical disk 104, and of reflecting a laser beam reflected from the optical disk 104. The optical disk 104 is a DVD or a CD. The detection lens 105 is an astigmatism-generating element. Since the detection lens 105 has a shape of a so-called columnar lens or cylindrical lens, focal distances on two perpendicular cross sections including an optical axis are different. An optical receiver 106 has a light-detecting portion 107 that detects light reflected from the optical disk 104.

Light emitted from the light source 101 is transmitted through the beam splitter 103 and is then incident on the optical disk 104. Light reflected from the optical disk 104 is reflected by the beam splitter 103, is incident on the detection lens 105, and is then incident on the optical receiver 106.

FIG. 15A is an explanatory view illustrating a known detection lens, FIG. 15B is a view illustrating a state of a spot when an optical disk is near, and FIG. 15C is a view illustrating a state of a spot when an optical disk is far. Referring to FIG. 15A, light 108 transmitted through the detection lens 105 forms a focal point in the neighborhood of the optical receiver 106. A focal point 109 of the light 108 on a cross section in the vertical direction is positioned ahead of the optical receiver 106, and a focal point 110 of the light 108 on a cross section in the horizontal direction is positioned behind the optical receiver 106. That is, the optical receiver 106 is disposed between the two focal points 109 and 110. The shape of a spot 111 on the optical receiver 106 is substantially circular.

As shown in FIG. 15B, in the case where the optical disk 104 is close to an optical pickup device, the spot 111 of a laser beam in the optical receiver 106 becomes long in the horizontal direction. On the other hand, as shown in FIG. 15C, in the case where the optical disk 104 is far from the optical pickup device, the spot 111 has a long shape in the vertical direction. A focus control signal can be obtained by disposing the A to D light-detecting portions 107 in a cross shape and calculating a focus error signal FES=(A+C)−(B+D). That is, since the focus error signal FES>0 in the case where the optical disk 104 is near and the focus error signal FES<0 in the case where the optical disk 104 is far, the position of the optical disk 104 can be checked.

SUMMARY

JP-A-63-249101 describes an optical pickup device which is small and is high in precision and in which a detection lens as a Fresnel lens is united with a optical receiver, even though an example of only one wavelength is shown. FIG. 16A is a cross-sectional view illustrating a normal lens, and FIG. 16B is a cross-sectional view illustrating a Fresnel lens. A Fresnel lens 113 is a lens obtained by dividing a normal lens 112 for every predetermined height d and moving each of the divided parts in order to make the entire lens thin. A depth d of a level difference 113a of the Fresnel lens 113 is equivalent to the predetermined height d by which the lens 112 is divided. In addition, a region where a refraction operation is actually performed is an orbicular band shaped lens portion that is called a ring band 113a. The astigmatism-generating element has been explained as a lens but may also be a mirror.

A level difference of the Fresnel lens or Fresnel mirror as an astigmatism-generating element is preferably made to match a wavelength used so that diffraction does not occur. However, light beams having two different wavelengths of light for DVD and light for CD are incident on the astigmatism-generating element. Accordingly, at least one of the light for DVD and the light for CD causes diffraction. There is a case where diffracted light appears as stray light on the optical receiver and is incident on a light-detecting portion other than original light-detecting portions. This was one of causes that make tracking control or focus control unstable.

In view of the above problems, as well as other concerns, an optical pickup device and an optical disk device are provided that are small and capable of realizing stabilized tracking control and focus control.

The optical pickup device includes: a light source that emits light with a wavelength λ1 and light with a wavelength λ2, which is longer than the wavelength λ1, toward an optical disk from adjacent positions; an optical receiver that detects light reflected from the optical disk; and an astigmatism-generating element that generates light used for focus control in a condition where a focusing position on one of two perpendicular cross sections including an optical axis of the light reflected from the optical disk is located ahead of the optical receiver and a focusing position on the other cross section is located behind the optical receiver. The astigmatism-generating element is a Fresnel mirror configured to include a plurality of orbicular band shaped reflecting mirrors. A level difference between the orbicular band shaped reflecting mirrors adjacent to each other is distributed in a range from a depth of substantially (natural number/2) times the wavelength λ1 to a depth of substantially (natural number/2) times the wavelength λ2, from a region where the light with the wavelength λ1 is incident toward a region where the light with the wavelength λ2 is incident.

DETAILED DESCRIPTION

First Embodiment

Figure 1A:
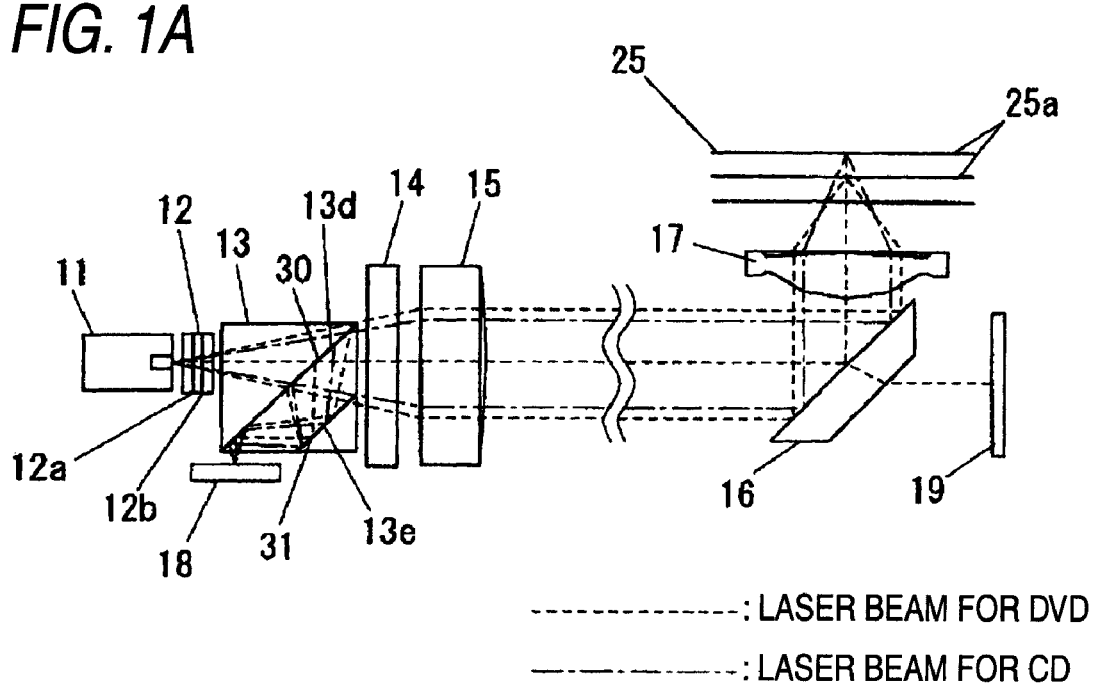
FIG. 1A is a view illustrating the configuration of an optical system of an optical pickup device according to a first embodiment.
Figure 1B:
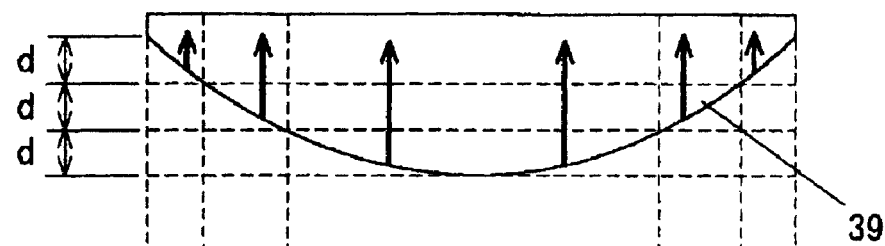
FIG. 1B is a view illustrating a normal three-dimensional curved mirror.
Figure 1C:
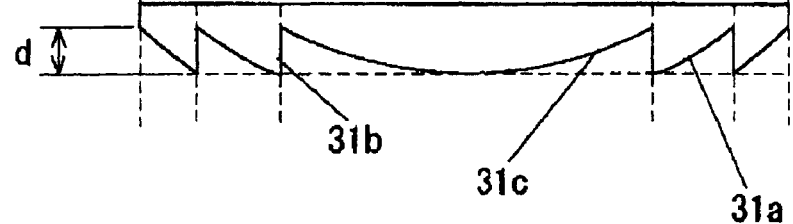
FIG. 1C is a view illustrating a Fresnel mirror.

A first embodiment will be described with reference to the accompanying drawings. FIG. 1A is a view illustrating the configuration of an optical system of an optical pickup device according to the first embodiment, FIG. 1B is a view illustrating a normal three-dimensional curved mirror, and FIG. 1C is a view illustrating a Fresnel mirror.

A light source 11 emits a laser beam for DVD having a wavelength $\lambda 1$ of about 650 nm and a laser beam for CD having a wavelength $\lambda 2$ of about 780 nm toward an optical disk 25 from the adjacent positions. A distance between emission positions of laser beams having two wavelengths is about 110 μm. In the first embodiment, the emission position of the laser beam with the wavelength $\lambda 1$ and the emission position of the laser beam with the wavelength $\lambda 2$ are arranged to align substantially in parallel on a surface of the optical disk 25. In addition, a laser beam emitted may be used in combination with a laser beam having a wavelength $\lambda 3$ of about 405 nm that is used in a Blu-ray Disc or HD-DVD.

A diffraction element 12 has a first diffraction grating 12a and a second diffraction grating 12b, and the first diffraction grating 12a and the second diffraction grating 12b are disposed in series. The first diffraction grating 12a diffracts the laser beam with the wavelength $\lambda 1$ into zero-order light or ±1-order light and makes the laser beam with the wavelength $\lambda 2$ transmitted therethrough. The second diffraction grating 12b diffracts the laser beam with the wavelength $\lambda 2$ into zero-order light or ±1-order light and makes the laser beam with the wavelength $\lambda 1$ transmitted therethrough. The light that has been diffracted into zero-order light or ±1-order light by the diffraction element 12 is incident on a optical receiver 18 and is used for a tracking control of the optical pickup device.

An integrated prism 13 has slopes 13d and 13e, which are parallel to each other, thereinside. A beam splitter 30 is formed on the slope 13d. In the first embodiment, the beam splitter 30 makes laser beams emitted from the light source 11, which are forward light beams and have wavelengths $\lambda 1$ and $\lambda 2$, transmitted toward the optical disk 25 and makes laser beams reflected from the optical disk 25, which are returning light beams and have the wavelengths $\lambda 1$ and $\lambda 2$, reflected toward the optical receiver 18. The beam splitter 30 is formed of a polarization separating film of a dielectric multilayer.

An astigmatism-generating element 31 is formed on the slope 13e. The astigmatism-generating element 31 is an optical element in which focusing positions on two perpendicular cross sections including an optical axis of light passing through the astigmatism-generating element 31 are different from each other. The optical receiver 18 is disposed such that the focusing position of emitted light on one cross section is located ahead of the optical receiver 18 and the focusing position of reflected light on the other cross section is located behind the optical receiver 18. The light transmitted through the astigmatism-generating element 31 is incident on the optical receiver 18 and is used for focus control of the optical pickup device. By using a Fresnel mirror 31a configured to include a plurality of reflecting mirrors, the astigmatism-generating element 31 is formed.

The Fresnel mirror 31a is a reflecting mirror configured to include a plurality of orbicular band shaped reflecting mirrors in order to make a normal three-dimensional curved mirror 39 compact. The reflecting mirrors can be, for example, orbicular band or curve shaped, and will be referred to here simply as a ring band 31c. A level different occurring on the boundary between the ring bands 31c adjacent to each other is simply called a level difference 31b.

Figure 2A:
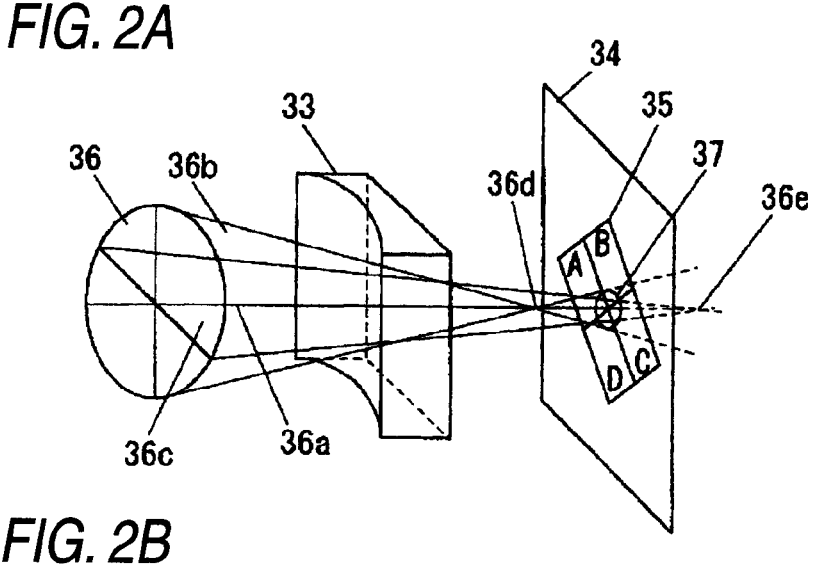
FIG. 2A is an explanatory view illustrating an astigmatism-generating element.
Figure 2B:
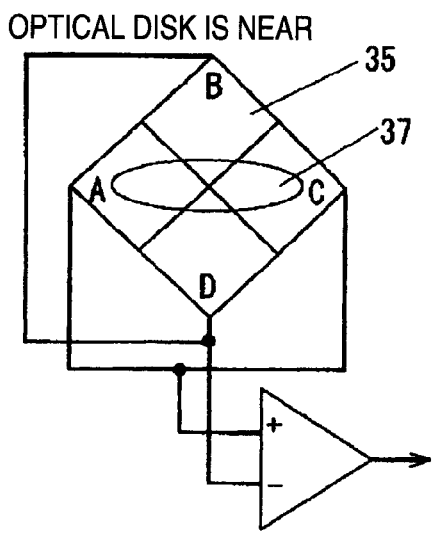
FIG. 2B is a view illustrating the shape of a spot when an optical disk is near and FIG. 2C is a view illustrating the shape of a spot when an optical disk is far.
Figure 2C:
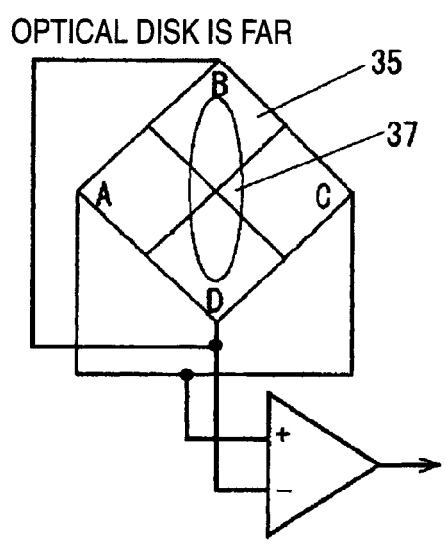

FIG. 2A is an explanatory view illustrating an astigmatism-generating element, FIG. 2B is a view illustrating the shape of a spot when an optical disk is near, and FIG. 2C is a view illustrating the shape of a spot when an optical disk is far. The astigmatism-generating element 33 is an optical element in which focal distances on two perpendicular cross sections 36b and 36c including an optical axis 36a are different from each other. Examples of the astigmatism-generating element 33 include a so-called columnar lens, cylindrical lens, or combination thereof and a cylindrical reflecting mirror, a columnar reflecting mirror, or a combination thereof. In FIG. 2A, the astigmatism-generating element 33 is formed as a cylindrical lens for the simplicity sake.

The laser beam reflected from the optical disk 25 is converted into light converging on the light source 11 by the collimating lens 15 and returns. However, since the light is separated from the forward light so as to move toward the optical receiver 18 by the beam splitter 30, the laser beam incident on the astigmatism-generating element 31 is converging light. Laser beams condense near the optical receiver 18. Accordingly, a laser beam 36 incident on the astigmatism-generating element 33 is also converging light and is treated as light condensing near the optical receiver 34.

In FIG. 2A, the laser beam 36 on the cross section 36b in the vertical direction including the optical axis 36a is transmitted through the astigmatism-generating element 33 and converges on a focal point 36d. On the other hand, the laser beam 36 on the cross section 36c in the horizontal direction including the optical axis 36a tends to converge on a focal point 36e which is farther than the focal point 36d backward, since the astigmatism-generating element 33 functions as a concave lens. The optical receiver 34 is disposed between the focal point 36d and the focal point 36e. That is, the optical receiver 34 is disposed such that the focal point 36d is positioned ahead of the optical receiver 34 and the focal point 36e is positioned behind the optical receiver 34. That is, the laser beam 36 in the direction of the cross section 36b first converges on the focal point 36d and is then incident on the optical receiver 34 in a slightly spread state. The laser beam 36 in the direction of the cross section 36c is incident on the optical receiver 34 in a slightly spread state before converging on the focal point 36e. As a result, a spot 37 on the optical receiver 34 has a substantially circular shape in a slightly spread state.

Referring to FIG. 2A, in the optical receiver 34, A to D light-detecting portions 35 which receive the laser beams 36 with the wavelengths λ1 and λ2 reflected from the optical disk 25 are disposed in a cross shape. The A and C light-detecting portions 35 are disposed in the left and right direction, and the B and D light-detecting portions 35 are disposed in the up and down direction. The A to D light-detecting portions 35 convert the received light into an electric signal. An electric signal converted by the A light-detecting portion 35, an electric signal converted by the B light-detecting portion 35, an electric signal converted by the C light-detecting portion 35, and an electric signal converted by the D light-detecting portion 35 are assumed to be A, B, C, and D, respectively. The focus error signal FES, which is a focus control signal, can be obtained by calculating FES=(A+C)−(B+D).

In the case where the optical disk 25 is close to an optical pickup device as shown in FIG. 2B, the focal points 30d and 36e are distant from the optical disk 25. Accordingly, the focal point 36d becomes close to the optical receiver 34 and the focal point 36e becomes distant from the optical receiver 34. For this reason, the dimension of the spot 37 in the vertical direction becomes short and the dimension of the spot 37 in the horizontal direction becomes long. Accordingly, the focus error signal FES becomes larger than 0. In contrast, in the case where the optical disk 25 is far from the optical pickup device 10 as shown in FIG. 2C, the focal points 36d and 36e are close to the optical disk 25. Accordingly, the focal point 36d becomes distant from the optical receiver 34 and the focal point 36e becomes close to the optical receiver 34. For this reason, the dimension of the spot 37 in the vertical direction becomes long and the dimension of the spot 37 in the horizontal direction becomes short. Accordingly, the focus error signal FES becomes larger than 0. Thus, the focus error signal FES is a focus control signal indicating the positional deviation of the optical disk 25 in the focusing direction. The focus control is performed such that the focus error signal FES becomes 0 or a predetermined value.

In FIG. 1A, the wavelength plate 14 converts the direction of polarization. The wavelength plate 14 converts a forward laser beam emitted from the light source 11, which is linearly polarized light, into circularly polarized light and converts a returning laser beam reflected from the optical disk 25, which is circularly polarized light, into linearly polarized light shifted by 90° from the forward laser beam. By changing the phase of linearly polarized light by means of a function of the wavelength plate 14, the beam splitter 30 can make the forward laser beam transmitted and the returning laser beam reflected.

A collimating lens 15 converts forward light, which is diverging light, into approximately parallel light and converts returning light, which is parallel light, into converging light.

A rising mirror 16 is a reflecting mirror that changes the direction such that the forward light substantially parallel to a surface of the optical disk 25 forms substantially a right angle with respect to the surface of the optical disk 25. A polarization separating film is formed on the surface of the rising mirror 16, such that a part of forward light is transmitted to move toward a second optical receiver 19.

An objective lens 17 is a lens that makes conversion such that forward laser beams, which are parallel beams, converge on a recording surface 25a of the optical disk 25.

Figure 3:
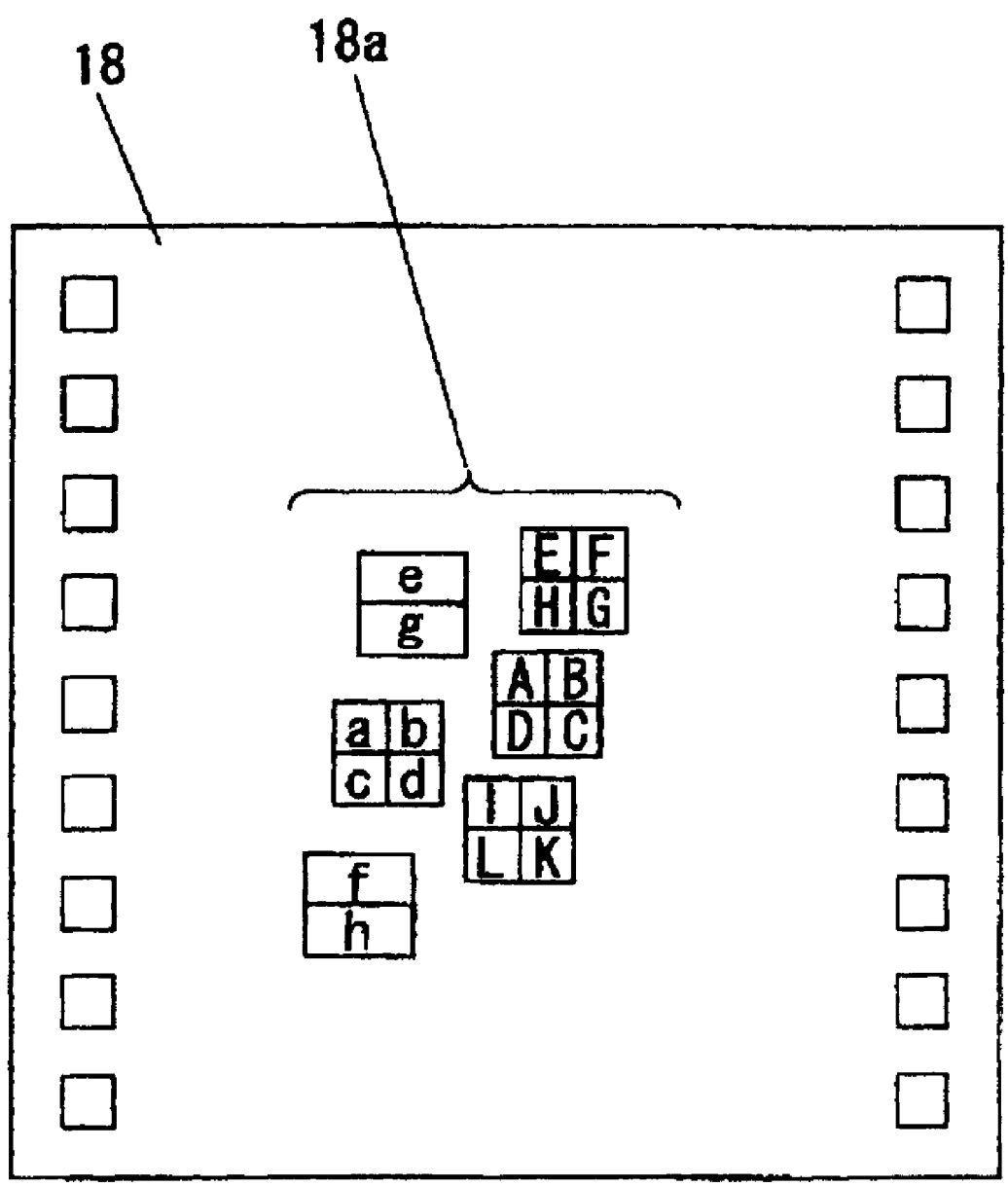
FIG. 3 is a view illustrating the layout of a light-detecting portion in an optical receiver in the first embodiment.

FIG. 3 is a view illustrating the layout of a light-detecting portion in an optical receiver in the first embodiment. The optical receiver 18 detects a laser beam that is emitted from the light source 11 and is reflected from the optical disk 25. The optical receiver 18 converts light detected in a light-detecting portion 18a into an electric signal and outputs the converted signal. The output signal is used for focus control, tracking control, and reproduction of information recorded on the recording surface 25a of the optical disk 25, for example.

The optical receiver 18 has light-detecting portions 18a of A to L and a to h. A laser beam for DVD with the wavelength λ1 is incident on the light-detecting portions 18a of A to L. A laser beam for CD with the wavelength λ2 is incident on the light-detecting portions 18a of a to h. Zero-order light generated by the first diffraction grating 12a is incident on the light-detecting portions 18a of A to D, and one of ±1-order laser beams is incident on the light-detecting portions 18a of E to G and I to L. In addition, zero-order light generated by the second diffraction grating 12b is incident on the light-detecting portions 18a of a to d, and one of ±1-order laser beams is incident on the light-detecting portions 18a of e and g and f and h. The light-detecting portions 18a of A to D and the light-detecting portions 18a of a to d in FIG. 3 correspond to the light-detecting portions 35 of A to D in FIG. 2.

In the first embodiment, the astigmatism-generating element 31 is rotated by 45° in the direction perpendicular to the optical axis 36a with respect to the astigmatism-generating element 33. Accordingly, the light-detecting portion 18a of the optical receiver 18 is rotated by 45° within a surface of the light-detecting portion 35 of the optical receiver 34. As a result, since the boundary of the light-detecting portions 18a of A to D within the optical receiver 18 become vertical and horizontal, it becomes easy to design the arrangement of the light-detecting portions 18a including the other light-detecting portions 18a.

In the optical receiver 18, electric signals for DVD that are incident on the light-detecting portions 18a of A, B, C, D, E, F, G, H, I, J, K, and L and are converted are assumed to be A, B, C, D, E, F, G, H, I, J, K, and L, respectively. Electric signals for CD that are incident on the light-detecting portions 18a of a, b, c, d, e, f, g, and h and are converted are assumed to be a, b, c, d, e, f, g, and h, respectively.

The focus error signal FES for DVD is FES=(A+C)−(B+D) in the case of DVD-ROM and DVD±R/RW and FES={(A+C)−(B+D)}+Kt×{(E+I+G+K)−(H+L+F+J)} in the case of DVD-RAM. Here, Kt is a constant determined according to operation setting. The focus error signal FES is a signal indicating focus deviation of a spot.

The focus error signal FES for CD is FES=(a+c)−(b+d) in the case of CD-R/RW/ROM.

A tracking error signal TES for DVD is TES=ph(A, D)−ph(B, C) in the case of DVD-ROM and TES={(A+B)−(C+D)}−Kt×{(E+I+F+J)−(G+K+H+L)} in the case of DVD±R/RW and DVD-RAM. Here, ph(X, Y) is a voltage obtained by converting a phase difference between X and Y detected. The tracking error signal TES is a signal indicating track position deviation of a spot.

The tracking error signal TES for CD is TES={(a+b)−(c+d)}−Kt×{(e+f)−(g+h)} in the case of CD-R/RW/ROM and TES=ph(a, d)−ph(b, c) in the case of CD-ROM. Usually, the former method capable of performing a tracking control more stably is used. However, for example, in the case of reproducing a poor disk in which the height of a pit of a CD-ROM does not comply with the standards, the tracking error signal TES may not be output satisfactorily in the former method. In such a case, the latter method can be used as a preparatory tracking control method since the tracking error signal TES can be output satisfactorily. Thus, since a tracking control can also be made in the case of reproducing a poor disk which does not comply with the standards so as not to make a tracking control, it is possible to meet the optical disk 25 in a broader range as an optical disk device.

Moreover, in FIG. 3, the arrangement of the light-detecting portions 18a of E to H, A to D, I to L and the light-detecting portions 18a of e and g, a to d, and f and h are made to be slightly shifted from each other in the vertical direction of the drawing. This is because when zero-order light converges on a track of the recording surface 25a of the optical disk 25, ±1-order light converges in a state where the ±1-order light is shifted from the track. Accordingly, in the case when the zero-order light and the ±1-order light converge on the same track, the light-detecting portions 18a of E to H, A to D, and I to L and the light-detecting portions 18a of e and g, a to d, and f and h are arrayed in the vertical direction of the drawing.

Referring to FIG. 1A, the second optical receiver 19 detects a laser beam which is emitted from the light source 11 and is not incident on the optical disk 25. A signal output from the second optical receiver 19 is used to control the output of a laser beam emitted from the light source 11.

The optical disk 25 can be, for example, a DVD or a CD, for example. In the case when the light source 11 that emits a laser beam with a wavelength λ3 is used, the optical disk may also be a Blu-ray Disc or an HD-DVD.

A laser beam emitted from the light source 11 is diffracted into zero-order light or ±1-order light by the diffraction element 12, is transmitted through the beam splitter 30 of the integrated prism 13, and is incident on the wavelength plate 14. The laser beam is converted from linearly polarized light into circularly polarized light by the wavelength plate 14, is converted from diverging light into parallel light by the collimating lens 15, is reflected by the rising mirror 16 to convert the propagating direction, and is incident on the objective lens 17. A part of light is transmitted to be incident on the second optical receiver 19. The laser beam is converted into converging light by the objective lens 17 and is then condensed onto the recording surface 25a of the optical disk 25.

The laser beam reflected from the recording surface 25a of the optical disk 25 is converted from diverging light into parallel light by the objective lens 17, and the direction of the laser beam is converted by the rising mirror 16. Then, the laser beam is converted from parallel light into converging light by the collimating lens 15 and is incident on the wavelength plate 14. The light is converted into linearly polarized light having a phase different from the forward light by the wavelength plate 14, is reflected from the beam splitter 30 of the integrated prism 13, and is incident on the astigmatism-generating element 31. The laser beam is reflected in a state where the astigmatism used for focus control is reflected by the astigmatism-generating element 31 and is then incident on the optical receiver 18.

Figure 4:
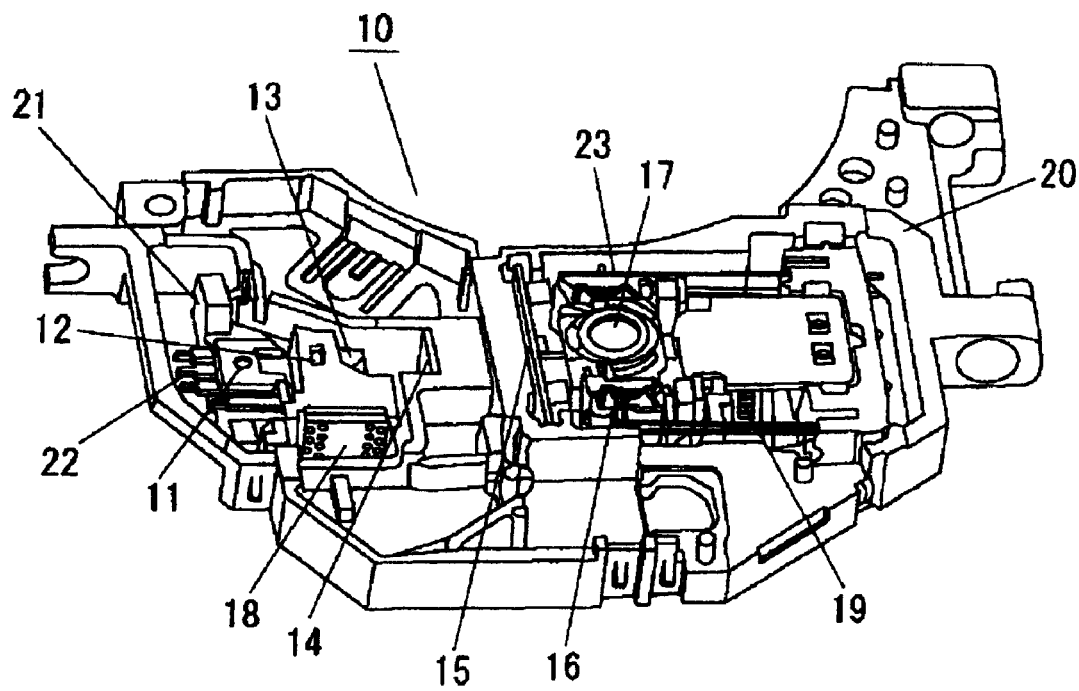
FIG. 4 is a view illustrating the configuration of an optical pickup device from which a cover in the first embodiment is removed.

FIG. 4 is a view illustrating the configuration of an optical pickup device from which a cover in the first embodiment is removed. An optical pickup device 10 is configured to include various components disposed on a pedestal 20. The pedestal 20 is a skeleton of the optical pickup device 10. The pedestal 20 is formed of an alloy material, such as a Zn alloy or an Mg alloys or a hard resin material. Preferably, the pedestal 20 is formed of an alloy material that is easy to secure the rigidity. An attaching portion for disposing various components is provided at a predetermined place of the pedestal 20.

The light source 11, the diffraction element 12, the integrated prism 13, and the optical receiver 18 are fixed to a bonding member 21 to thereby form a laser module 22, and the bonding member 21 is fixed to the pedestal 20. The objective lens 17 is mounted in an actuator 23 that drives the objective lens 17, and the actuator 23 is fixed to the pedestal 20.

The wavelength plate 14, the collimating lens 15, the rising mirror 16, and the second optical receiver 19 are fixed to the pedestal 20 directly or through another attaching member.

Figure 5:
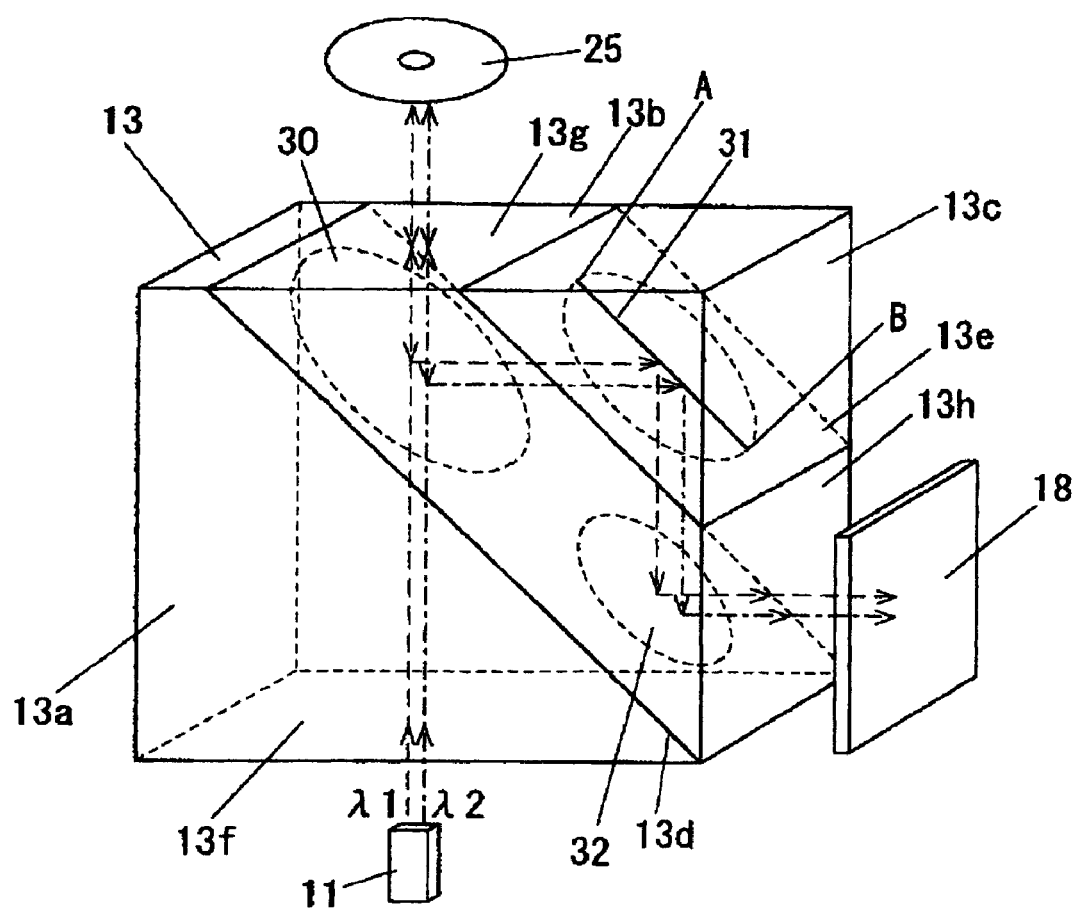
FIG. 5 is a view illustrating the configuration of an optical system related to an astigmatism-generating element in the first embodiment.
Figure 6:
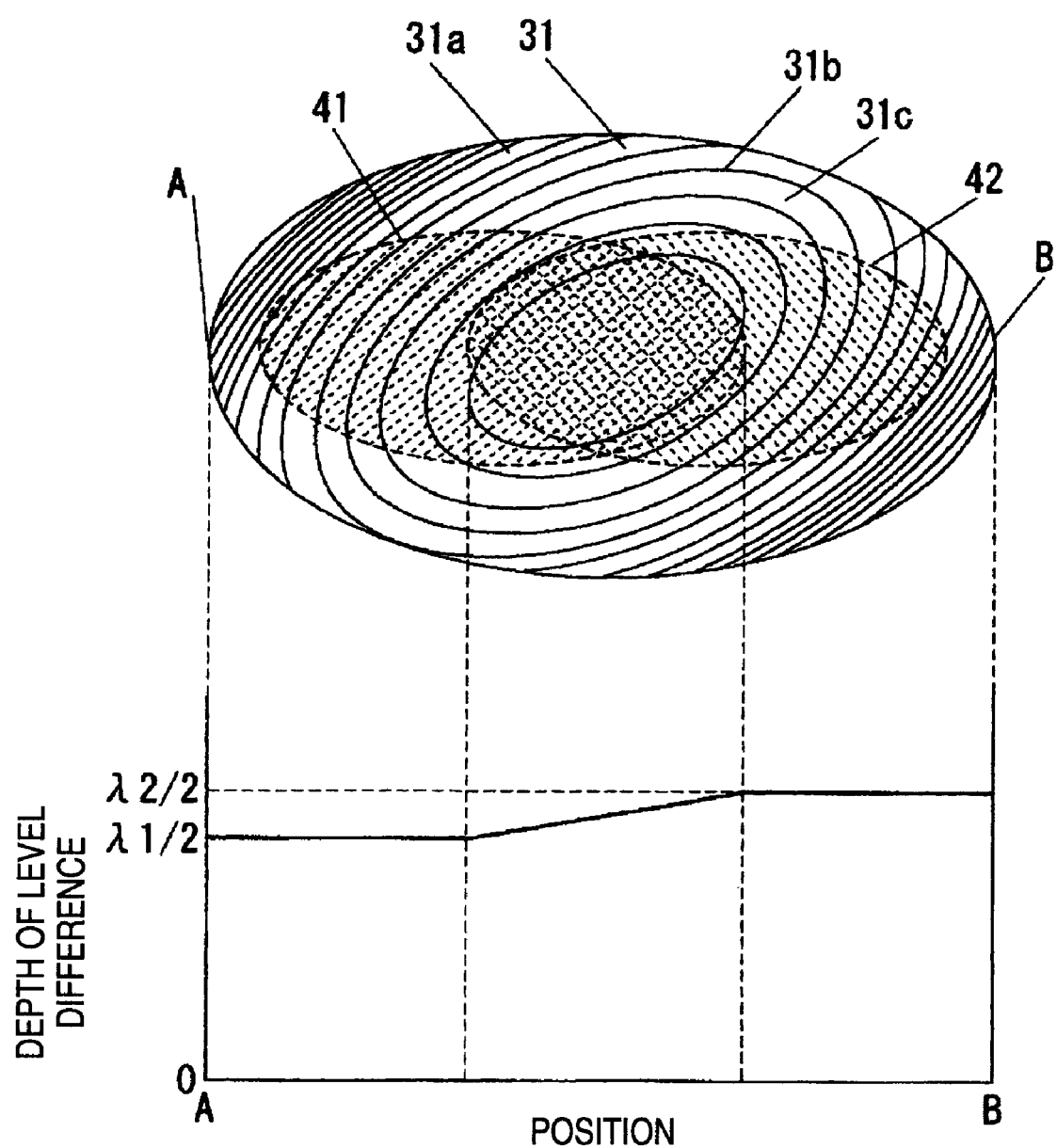
FIG. 6 is a view illustrating the distribution of the depth of a level difference of the astigmatism-generating element in the first embodiment.

FIG. 5 is a view illustrating the configuration of an optical system related to the astigmatism-generating element in the first embodiment, and FIG. 6 is a view illustrating the distribution of the depth of a level difference that the astigmatism-generating element in the first embodiment has. The integrated prism 13 can include three blocks 13a, 13b, and 13c. A bonding surface between the blocks 13a and 13b is the slope 13d and a bonding surface between the blocks 13b and 13c is the slope 13e. The blocks 13a, 13b, and 13c are formed of optical glass, such as, for example, BK7. The blocks 13a, 13b, and 13c may also be formed of optical plastics. A reflecting film 32 is formed on the slope 13d in addition to the beam splitter 30. The reflecting film 32 can be, for example, a metallic film or a dielectric multilayer. The reflecting film 32 may also be a film common with the beam splitter 30. In addition, the slopes 13d and 13e are parallel and are inclined by about 45° with respect to side surfaces 13f, 13g, and 13h through which laser beams having the wavelengths λ1 and λ2 are emitted from or incident on the integrated prism 13.

The laser beam incident on the side surface 13f of the integrated prism 13 from the light source 11 is transmitted through the slope 13d, is emitted from the side surface 13g, and is incident on the optical disk 25. At this time, the laser beam is transmitted at an input/output angle of about 45° with respect to the beam splitter 30. The laser beam reflected from the optical disk 25 is incident on the side surface 13g, is reflected from the slope 13d, is reflected from the slope 13e, is further reflected from the slope 13d, is emitted from the side surface 13h and is then incident on the optical receiver 18. At this time, the laser beam is reflected at an input I output angle of about 45° with respect to the beam splitter 30. In addition, the laser beam is also reflected at an input/output angle of about 45° with respect to the Fresnel mirror 31a that is the astigmatism-generating element 31.

The positions of laser beams with two wavelengths incident on the Fresnel mirror 31a are separated from each other by a distance of approximately 110 μm, which is the same distance separating the laser beams with two wavelengths when emitted from the light source 11. In the first embodiment, the light source 11 is disposed so that the laser beam with the wavelength λ1 is incident on a side close to a point A of the Fresnel mirror 31a and the laser beam with the wavelength λ2 is incident on a side close to a point B of the Fresnel mirror 31a. As shown in FIG. 6, in the Fresnel mirror 31a, a spot 41 of the laser beam with the wavelength λ1 and a spot 42 of the laser beam with the wavelength λ2 are distributed in a state where the centers of the spots 41 and 42 deviate from each other and accordingly, parts of the spots 41 and 42 overlap. The depth d of the level difference 31b from the point A to the point B in the Fresnel mirror 31a is distributed in a range from a depth d1 of substantially (natural number/2) times the wavelength λ1 to a depth d2 of substantially (natural number/2) times the wavelength λ2, from a region where light with the wavelength λ1 is incident toward a region where light with the wavelength λ2 is incident.

The depth d of the level difference 31b and the wavelength λ of a laser beam have the following relationship. Laser beams which are incident on the neighborhood of the boundary of the adjacent ring bands 31c and are reflected exactly cancel each other to make a diffracted light component zero, assuming that a difference between the optical path length of a laser beam, which is incident on a reflecting surface of the ring band 31c on a front side and is then reflected, and the optical path length of a laser beam, which is incident on a reflecting surface of the ring band 31c on a back side and is then reflected, is natural number multiples of a wavelength. That is, it is preferable that twice the depth of the level difference 31b corresponding to a forward and reflected light portion be natural number multiples of the wavelength. Here, "(natural number/2) times of the wavelength of a laser beam" includes effects of a refractive index and an incident angle. Accordingly, assuming that the wavelength of a laser beam is λ, the refractive index is n, the incident angle is θi, and the natural number is m, the preferable depth d of the level difference 31b is d=(m/2)·λ/(cos(θi)·n). For example, assuming that the wavelength of a laser beam is λ=λ2=780 nm, the refractive index as a refractive index of BK7 is n=1.51, the incident angle θi is 45°, and m is 1, d is 365 nm.

In the case where the depth d of the level difference 31b is (natural number/2) times a wavelength of incident light, it is most preferable that a component of diffracted light caused by the level difference 31b be eliminated for phase matching. Since light with the wavelength λ1 and light with the wavelength λ2 are emitted from different positions in the light source 11, the light with the wavelength λ1 and the light with the wavelength λ2 are incident on different positions also in the Fresnel mirror 31a with a certain distribution. Therefore, the phase matching can be realized to some extent for both the light with the wavelength λ1 and the light with the wavelength λ2 by distributing the depth d Of the level difference 31b in a range from the depth d1 of substantially (natural number/2) times the wavelength λ1 to the depth d2 of substantially (natural number/2) times the wavelength λ2, from a region where the light with the wavelength λ1 is incident toward a region where the light with the wavelength λ2 is incident. For this reason, since a component of diffracted light caused by the level difference 31b is reduced for both the light with the wavelength λ1 and the light with the wavelength λ2, stray light on the optical receiver 18 can be suppressed. As a result, the tracking control or the focus control is stabilized. In addition, since the Fresnel mirror 31a is used as the astigmatism-generating element 31, miniaturization can be realized. Accordingly, miniaturization and stabilized recording and reproduction are possible.

In the first embodiment, the laser beam with the wavelength λ1 is a laser beam for DVD and the laser beam with the wavelength λ2 is a laser beam for CD. Therefore, satisfactory recording and reproduction can be performed on a DVD and a CD.

Moreover, in the first embodiment, the natural number m is set to 1, which is a smallest natural number, for both the laser beam with the wavelength λ1 and the laser beam with the wavelength λ2. That is, the depth of substantially (natural number/2) times of the wavelength λ1 is a depth of a half of the wavelength λ1, and the depth of substantially (natural number/2) times of the wavelength λ2 is a depth of a half of the wavelength λ2.

As will be described later, by exposing, developing, or etching a photosensitive resin for lithography, the shape of the Fresnel mirror 31a is formed. By setting of the smallest natural number m=1, the depth d of the level difference 31b becomes small. As a result, since the depth of the whole Fresnel mirror 31a can be made small, it is possible to sufficiently secure the shape of the ring band 31c and the precision of the level difference 31b and to shorten a manufacturing time.

Furthermore, in the case shown in FIG. 6, a depth d1 of substantially (natural number/2) times the wavelength λ1 is set in a region where only the spot 41 of the laser beam with the wavelength λ1 is distributed, and a depth d2 of substantially (natural number/2) times the wavelength λ2 is set in a region where only the spot 42 of the laser beam with the wavelength λ2 is distributed. In addition, in a region where the spot 41 of the laser beam with the wavelength λ1 and the spot 42 of the laser beam with the wavelength λ2 overlap each other, the depth d of the level difference 31b is continuously distributed so that depth d1 and the depth d2 are connected. Since the depth d of the proper level difference 31b can be obtained for every region, satisfactory recording and reproduction can be performed.

Figure 7A:
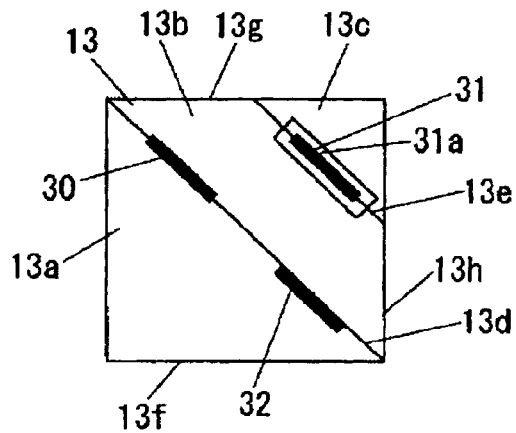
FIG. 7A is a view illustrating the configuration of an integrated prism in the first embodiment.
Figure 7D:
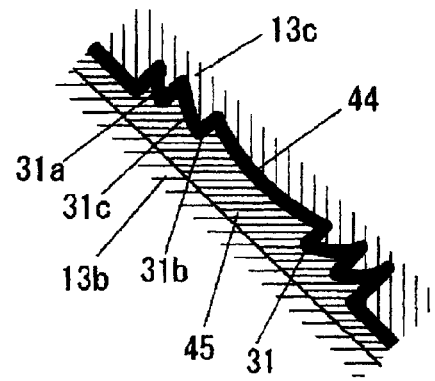
FIG. 7D is a view illustrating a third example of the configuration of the astigmatism-generating element in the first embodiment.
Figure 7B:
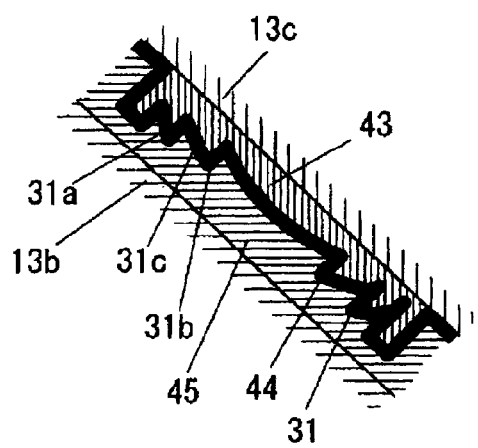
FIG. 7B is a view illustrating a first example of the configuration of the astigmatism-generating element in the first embodiment.
Figure 7E:
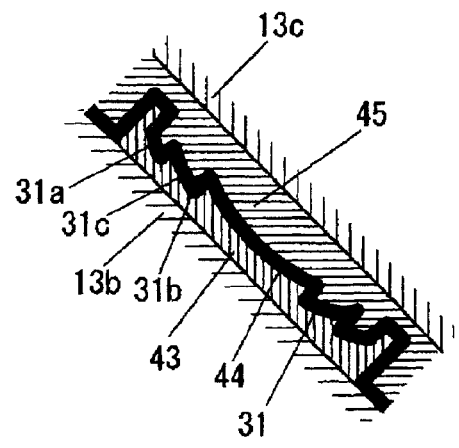
FIG. 7E is a view illustrating a fourth example of the configuration of the astigmatism-generating element in the first embodiment.
Figure 7C:
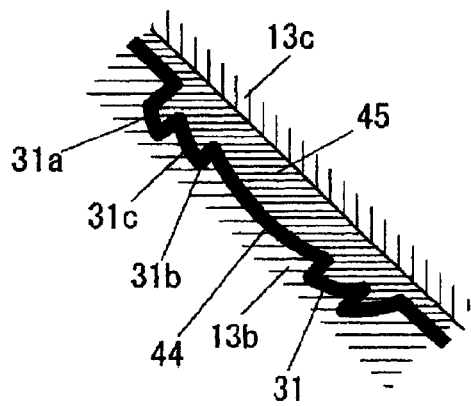
FIG. 7C is a view illustrating a second example of the configuration of the astigmatism-generating element in the first embodiment.

FIG. 7A is a view illustrating the configuration of the integrated prism in the first embodiment, FIG. 7B is a view illustrating a first example of the configuration of the astigmatism-generating element in the first embodiment, FIG. 7C is a view illustrating a second example of the configuration of the astigmatism-generating element in the first embodiment, FIG. 7D is a view illustrating a third example of the configuration of the astigmatism-generating element in the first embodiment, and FIG. 7E is a view illustrating a fourth example of the configuration of the astigmatism-generating element in the first embodiment.

In order to manufacture the astigmatism-generating element 31 in the first embodiment, it is desirable to use a gray scale mask allowing exposure in a predetermined shape. The gray scale mask is a mask whose transmittance with respect to light having a wavelength used for exposure changes continuously with a location in a portion equivalent to the ring band 31c. By using the gray scale mask, the depth of the level difference 31b and the curved shape of the continuous shape of the ring bands 31c, which is the original shape of the Fresnel mirror 31a, can be realized with high precision. Furthermore, the depth d of the level difference 31b can also be distributed in the Fresnel mirror 31a. By using the gray scale mask, the stepwise shape is not substantially observed in the ring bands 31c but the ring bands 31c become smooth.

Accordingly, the satisfactory spot shape can be obtained on the optical receiver 18 that receives a laser beam. In addition, since one exposure is enough without repeating exposure multiple times, the surface shape of the Fresnel mirror 31a that is very close to a designed shape can be obtained. In contrast, it is difficult to realize the depth d of the level difference 31b having distribution in a method of repeating the exposure multiple times.

A method of manufacturing the astigmatism-generating element 31 shown in FIG. 7B is as follows. First, the resin 43 is coated on a surface of the plate-shaped block 13c and is then cured. The resin 43 is a photosensitive resin for lithography and is a photoresist or a photosensitive polyimide, for example. Then, an irregular pattern having a predetermined shape is left in the resin 43 by performing development by irradiation of ultraviolet rays and exposure through the gray scale mask by which a predetermined irregular pattern of the ring band 31c and the level difference 31b can be formed. This irregular pattern becomes a reflecting surface shape of the Fresnel mirror 31a. Then, an absorption film is formed and then the reflecting film 44 is formed on the surface. The surface shapes of the absorption film and reflecting film 44 are substantially similar to the shape of the resin 43. The absorption film is a dielectric multilayer and the reflecting film 44 is a metallic film or a dielectric multilayer. Finally, the block 13b and the block 13c are bonded to each other with the adhesive 45. The adhesive 45 is an ultraviolet curable adhesive, a heat curable adhesive, or an anaerobic adhesive, for example. Preferably, the adhesive 45 is transparent for laser beams with the wavelengths λ1 and λ2 and has substantially the same refractive index as a material used to form the block 13b.

Furthermore, a method of manufacturing the integrated prism 13 shown in FIG. 7A is as follows. The beam splitter 30 and the reflecting film 32 are formed on a surface of the plate-shaped block 13a on a side of the slope 13d or a surface of the plate-shaped block 13b on a side of the slope 13d. Then, the block 13a and the block 13b are bonded to each other with an adhesive. The adhesive is an ultraviolet curable adhesive, a heat curable adhesive, or an anaerobic adhesive, for example.

In this way, one large block in which the plate-shaped block 13a, the plate-shaped block 13b, and the plate-shaped block 13c are bonded is formed. Then, the large block is cut in a predetermined shape and polished to thereby manufacture the integrated prism 13. Anti-reflection films may be formed on the side surfaces 13f, 13g, and 13h, which are surfaces through which a laser beam is incident or emitted, among surfaces of the integrated prism 13.

A method of manufacturing the astigmatism-generating element 31 in FIG. 7C is as follows. First, the resin 43 is coated on a surface of the plate-shaped block 13b and is then cured. Then, an irregular pattern having a predetermined shape is left in the resin 43 by performing development by irradiation of ultraviolet rays and exposure through the gray scale mask by which a predetermined irregular pattern of the ring band 31c and the level difference 31b can be formed. Then, an irregular pattern having a predetermined shape is formed on a surface of the block 13b by etching. At this time, since the resin 43 is completely etched, the resin 41 does not remain. This irregular pattern becomes a reflecting surface shape of the Fresnel mirror 31a. In this manner, the irregular pattern, which has a predetermined shape, of the ring bands 31c and the level difference 31b of the astigmatism-generating element 31 is formed on the surface of the block 13b. Then, the reflecting film 44 is formed and then an absorption film is formed on the surface. Finally, the block 13b and the block 13c are bonded to each other with the adhesive 45.

Since a laser beam does not pass through the adhesive 45, the adhesive 45 does not need to be transparent for a laser beam or to have substantially the same refractive index as a material used to form the block 13b.

A method of manufacturing the astigmatism-generating element 31 shown in FIG. 7D is as follows. First, the resin 43 is coated on a surface of the plate-shaped block 13c and is then cured. Then, an irregular pattern having a predetermined shape is left in the resin 43 by performing development by irradiation of ultraviolet rays and exposure through the gray scale mask by which a predetermined irregular pattern of the ring band 31c and the level difference 31b can be formed. Then, an irregular pattern having a predetermined shape is formed on a surface of the block 13c by etching. At this time, since the resin 43 is completely etched, the resin 41 does not remain. This irregular pattern becomes a reflecting surface shape of the Fresnel mirror 31a. In this manner, the irregular pattern, which has a predetermined shape, of the ring bands 31c and the level difference 31b of the astigmatism-generating element 31 is formed on the surface of the block 13c. Then, an absorption film is formed and then the reflecting film 44 is formed on the surface. Finally, the block 13b and the block 13c are bonded to each other with the adhesive 45. Preferably, the adhesive 45 is transparent for laser beams with the wavelengths λ1 and λ2 and has substantially the same refractive index as a material used to form the block 13b.

A method of manufacturing the astigmatism-generating element 31 shown in FIG. 7E is as follows. First, the resin 43 is coated on a surface of the plate-shaped block 13b and is then cured. Then, an irregular pattern having a predetermined shape is left in the resin 43 by performing development by irradiation of ultraviolet rays and exposure through the gray scale mask by which a predetermined irregular pattern of the ring band 31c and the level difference 31b can be formed. This irregular pattern becomes a reflecting surface shape of the Fresnel mirror 31a. Then, the reflecting film 44 is formed and then an absorption film is formed on the surface. Finally, the block 13b and the block 13c are bonded to each other with the adhesive 45. Preferably, the adhesive 43 is transparent for laser beams with the wavelengths λ1 and λ2 and has substantially the same refractive index as a material used to form the block 13b. However, since a laser beam does not pass through the adhesive 45, the adhesive 45 does not need to be transparent for a laser beam or to have substantially the same refractive index as a material used to form the block 13b.

In the cases shown in FIGS. 7B and 7E, the precision of the level difference 31b and the shape of the ring band 31c can be improved because the resin 43 is not etched, compared with the cases shown in FIGS. 7C and 7D. In addition, the astigmatism-generating element 31 can be manufactured at a lower cost by omitting the etching process.

In addition, the resin 43 that is a photosensitive resin for lithography is not necessarily waterproof. For example, when the moisture permeates, an optical property changes and accordingly, a refractive index changes or adhesion between the block 13b and the block 13c becomes weak and accordingly, the block 13b and the block 13c easily peel off from each other. As a result, the reliability lowers. In the first embodiment, the resin 43 is disposed so as not to be exposed to the outside of the integrated prism 13 as shown in FIGS. 7B and 7E. In addition, the resin 43 is covered with the reflecting film 44. Accordingly, it is possible to prevent the moisture from permeating the resin 43 directly from the outside. As a result, high reliability of the resin 43 can be maintained.

Moreover, in the first embodiment, the Fresnel mirror 31a is manufactured by using a photosensitive resin for lithography. However, the manufacturing method is not limited to the above method, but the ring bands 31c of the Fresnel mirror 31a and the shape of the level difference 31b may be manufactured by using a die.

Figure 8A:
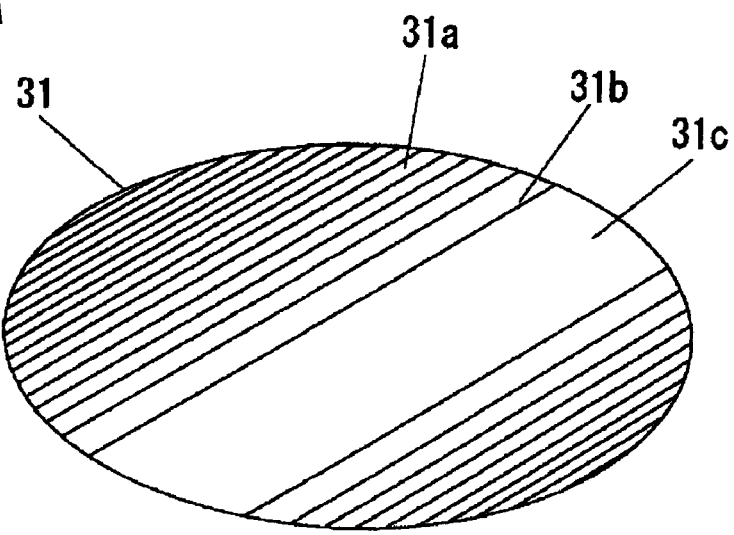
FIG. 8A is a view illustrating a first example of a level difference pattern of the astigmatism-generating element in the first embodiment.
Figure 8B:
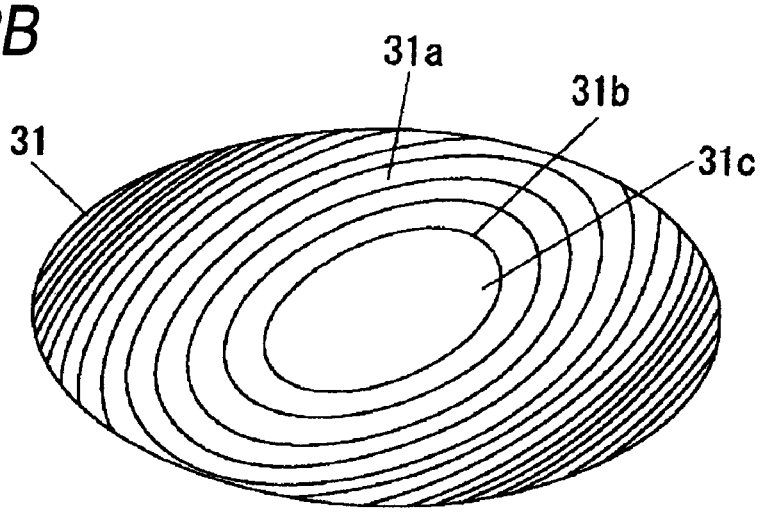
FIG. 8B is a view illustrating a second example of the level difference pattern of the astigmatism-generating element in the first embodiment.
Figure 8C:
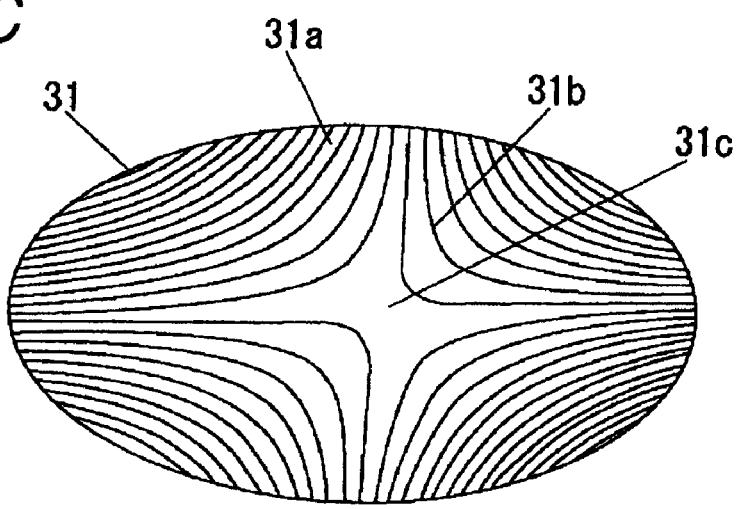
FIG. 8C is a view illustrating a third example of the level difference pattern of the astigmatism-generating element in the first embodiment.

FIG. 8A is a view illustrating a first example of the level difference pattern of the astigmatism-generating element in the first embodiment, FIG. 8B is a view illustrating a second example of the level difference pattern of the astigmatism-generating element in the first embodiment, and FIG. 8C is a view illustrating a third example of the level difference pattern of the astigmatism-generating element in the first embodiment. The longitudinal direction of the astigmatism-generating element 31 is a direction along the slope 13e. In addition, the reason why the level difference pattern appears to be inclined is because two perpendicular cross sections including an optical axis are inclined by 45° on the optical receiver 18. A line portion shown in FIGS. 8A, 8B, and 8C is the level difference 31b, and a portion between line portions is the ring band 31c.

The level difference pattern shown in FIG. 8A indicates that the astigmatism-generating element 31 is the Fresnel mirror 31a equivalent to a three-dimensional curved mirror having a cylindrical shape or a columnar shape. The level difference pattern shown in FIG. 8B indicates that the astigmatism-generating element 31 is the Fresnel mirror 31a equivalent to a curved mirror that is a concave mirror or a convex mirror having different radii of curvature at two perpendicular axes. The level difference pattern shown in FIG. 8C indicates that the astigmatism-generating element 31 is the Fresnel mirror 31a equivalent to a curved mirror in which one side is a concave mirror or the other side is a convex mirror at two perpendicular axes. Thus, the level difference pattern of the astigmatism-generating element 31 changes with the shape of the three-dimensional curved mirror.

As described above, in the case where the depth d of the level difference 31b is (natural number/2) times a wavelength of incident light, it is most preferable that a component of diffracted light caused by the level difference 31b be eliminated for phase matching. Since the light with the wavelength λ1 and the light with the wavelength λ2 are emitted from the different positions in the light source 11, the light with the wavelength λ1 and the light with the wavelength λ2 are incident on the different positions also in the Fresnel mirror 31a with a certain distribution. In the optical pickup device 10 according to the first embodiment, the phase matching can be realized to some extent for both the light with the wavelength λ1 and the light with the wavelength λ2 by distributing the depth d of the level difference 31b in a range from the depth of substantially (natural number/2) times the wavelength λ1 to the depth d2 of substantially (natural number/2) times the wavelength λ2, from a region where the light with the wavelength λ1 is incident toward a region where the light with the wavelength λ2 is incident. For this reason, since a component of diffracted light caused by the level difference 31b is reduced for both the light with the wavelength λ1 and the light with the wavelength λ2, stray light On the optical receiver 18 can be suppressed. As a result, the tracking control or the focus control is stabilized. In addition, since the Fresnel mirror 31a is used as the astigmatism-generating element 31, miniaturization can be realized. Accordingly, miniaturization and stabilized recording and reproduction are possible.

Furthermore, although the input/output angle has been set to 45° in the first embodiment, the other angles may also be set.

Furthermore, although the astigmatism-generating element 31 has been explained as the Fresnel mirror 31a in the first embodiment, the astigmatism-generating element 31 does not need to be a reflecting mirror, but the same is true for a case when the astigmatism-generating element 31 is a Fresnel lens.

Second Embodiment

A second embodiment will be described with reference to the accompanying drawings. An optical pickup device according to the second embodiment is an optical pickup device further including an astigmatism-generating element in the first embodiment in consideration of the incident angle distribution of laser beams incident on a Fresnel mirror.

Figure 9A:
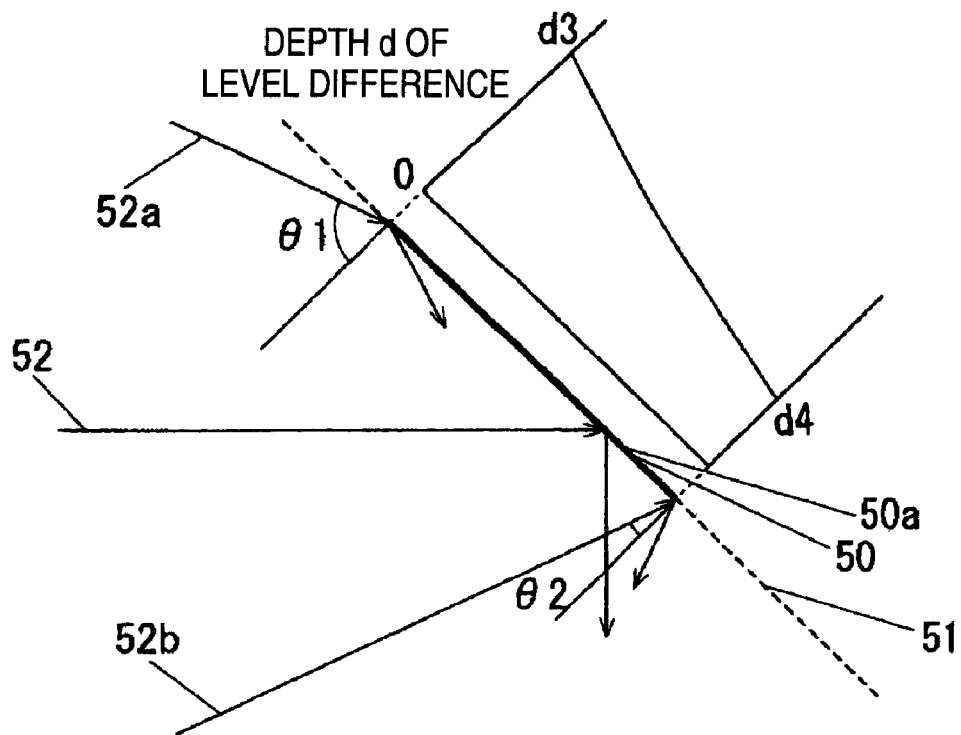
FIG. 9A is a view illustrating the relationship between an incident angle of a laser beam on an astigmatism-generating element in a second embodiment and the depth of a level difference.
Figure 9B:
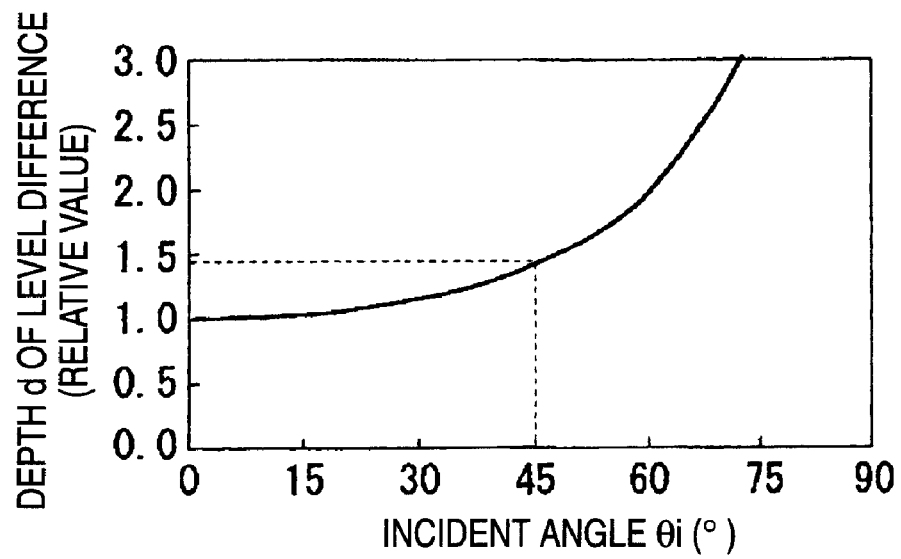
FIG. 9B is a view illustrating the relationship between an incident angle of a laser beam on an astigmatism-generating element and the depth of an optimal level difference.

FIG. 9A is a view illustrating the relationship between an incident angle of a laser beam on an astigmatism-generating element in the second embodiment and the depth of a level difference, and FIG. 9B is a view illustrating the relationship between an incident angle of a laser beam on an astigmatism-generating element and the depth of an optimal level difference. As also described in the first embodiment, a laser beam 52 incident on an astigmatism-generating element 50 which is a Fresnel mirror 50a is converging light. Accordingly, an incident angle θi of the laser beam 52 on the Fresnel mirror 50a changes with the position in the spot of the laser beam 52. Here, the incident angle θi is assumed to be an incident angle of a laser beam with respect to an imaginary surface 51 parallel to the slope 13e of the integrated prism 13 in the first embodiment.

Since the incident angle θi of the laser beam 52 in a middle portion thereof, which is an optical axis, is the same as that in the first embodiment, the incident angle θi is 45°. An incident angle θ1 of a laser beam 52a that first touches the imaginary surface 51 is larger than 45°, and an incident angle θ2 of a laser beam 52b that touches the imaginary surface 51 last is smaller than 45°. As described in the first embodiment, assuming that the wavelength of a laser beam is λ, the refractive index is n, the incident angle is θi, and the natural number is m, the preferable depth d of a level difference of the Fresnel mirror 50a is $d=(m/2)\cdot\lambda/(\cos(\theta i)\cdot n)$. Here, the relationship between the incident angle θi and the depth d of a level difference in the case of $(m/2\cdot\lambda/n)=1$ is shown in a graph shown in FIG. 9B. The depth d of a level difference becomes large as the incident angle θi increases. That is, even in the case of the laser beams 52 having the same wavelength λ, the depth d of a proper level difference depends on the incident angle θi when the laser beams 52 are converging light. The depth d of the proper level difference changes continuously from a depth d3 of a largest level difference at the position of a largest incident angle θ1 to a depth d4 of a smallest level difference at the position of a smallest incident angle θ2, as shown in FIG. 9A.

Thus, the optical pickup device according to the second embodiment is disposed such that reflected light incident on the Fresnel mirror 50a is converging light and the Fresnel mirror 50a is inclined at a predetermined angle with respect to the converging light. In addition, the depth d of the level difference is corrected to be deeper as the incident angle θI at a region where reflected light is incident becomes larger and to be shallower as the incident angle θI at a region where reflected light is incident becomes smaller.

The depth d of the level difference for phase matching becomes large as the incident angle θi increases, and the depth d of the level difference for phase matching becomes small as the incident angle θi decreases. By correcting this, the phase matching can be performed more correctly. Accordingly, a component of diffracted light caused by the level difference is reduced. As a result, since the stray light on the optical receiver can be suppressed, the tracking control or the focus control can be stabilized.

Figure 10:
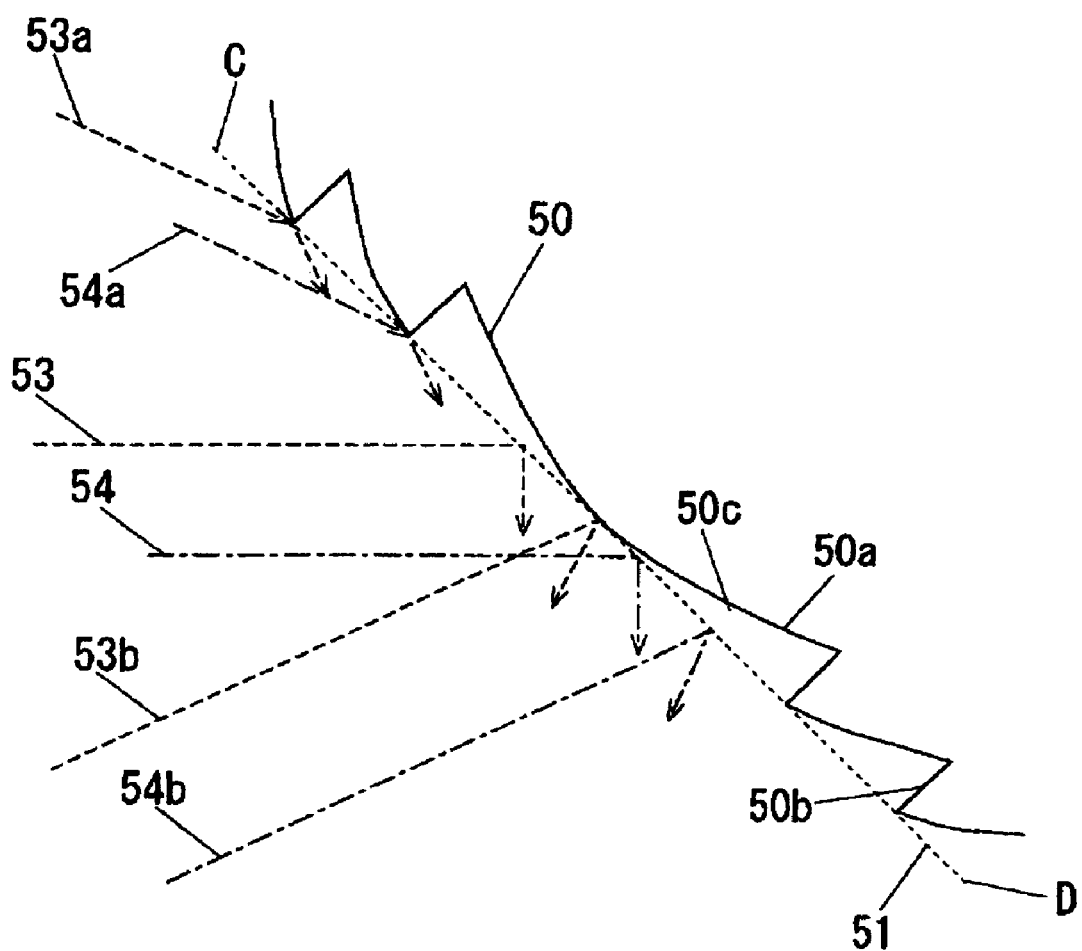
FIG. 10 is a view illustrating the relationship between the depth of a level difference of the astigmatism-generating element in the second embodiment and the incidence position and incident angle of a light beam.

FIG. 10 is a view illustrating the relationship between the depth of a level difference of the astigmatism-generating element in the second embodiment and the incidence position and incident angle of a light beam. A light source that emits a laser beam 53 for DVD with the wavelength λ1, which is a short wavelength, and a laser beam 54 for CD with the wavelength λ2, which is a long wavelength, from the adjacent positions is disposed as follows. For the Fresnel mirror 50a that is the astigmatism-generating element 50, a middle portion of the laser beam 53 is made to be incident on a side of a point C that is a side on which laser beams 53a and 54a, of which reflected light has the larger incident angle θi, are incident. In addition, a middle portion of the laser beam 54 is made to be incident on a side of a point D that is a side on which laser beams 53b and 54b, of which reflected light has the smaller incident angle θi, are incident. In addition, the distribution of the depth d of a level difference 50b in the Fresnel mirror 50a is set such that a range distributed in the Fresnel mirror 50a is smaller than the distribution in the first embodiment. The side of the point C is a side on which the laser beams 53 and 54 are incident earlier than on the side of the point D.

It is considered to make the depth d of the level difference 50b as small as possible in order to secure the precision of the depth d of the level difference 50b and of the shape of the ring band 50c and also to realize low-cost manufacturing. As shown in the first embodiment, the depth d of the level difference 50b is set to be small at a side close to the point C and large at a side dose to the point D by disposing a light source such that the laser beam 53 is incident on the side close to the point C and the laser beam 54 is incident on the side close to the point D. However, when the distribution of the incident angle θi of the laser beams 53 and 54 is taken into consideration, the depth d of the level difference 50b is corrected to be large at the side close to the point C and small at the side close to the point D. Accordingly, a distribution range of the depth d of the level difference 50b within the Fresnel mirror 50a becomes small, compared with a case where the distribution of the incident angle θi of the laser beams 53 and 54 is not considered. Depending on a condition, the depth d of the level difference 50b may be made to be substantially uniform within the Fresnel mirror 50a. In addition, the opposite distribution may also be set.

Thus, in the optical pickup device according to the second embodiment, the distribution of the depth d of the level difference 50b caused by a difference of the wavelength λ and the distribution of the depth d of the level difference 50b caused by the incident angle θi are offset by suppressing distribution of the depth d of the level difference 50b to a small range. As a result, since the depth d of the largest level difference 50b can be made small, manufacture becomes easy.

Furthermore, although the input/output angle has been set to 45° in the second embodiment, the other angles may also be set.

Furthermore, although the astigmatism-generating element 31 has been explained as the Fresnel mirror 50a in the second embodiment, the astigmatism-generating element 31 does not need to be a reflecting mirror, but the same is true for a case when the astigmatism-generating element 31 is a Fresnel lens.

Third Embodiment

Figure 11:
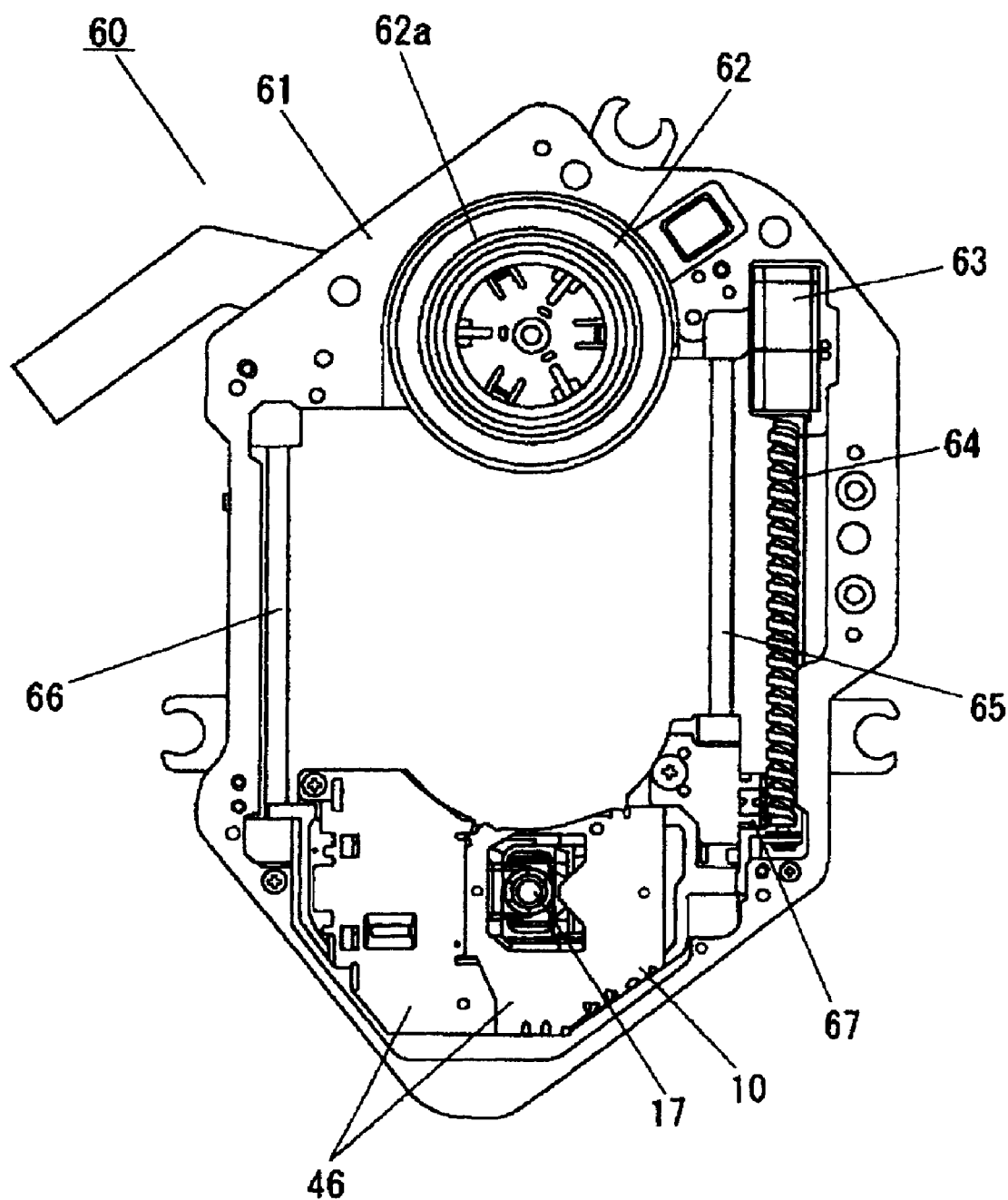
FIG. 11 is a view illustrating the configuration of an optical pickup module according to a third embodiment.
Figure 12:
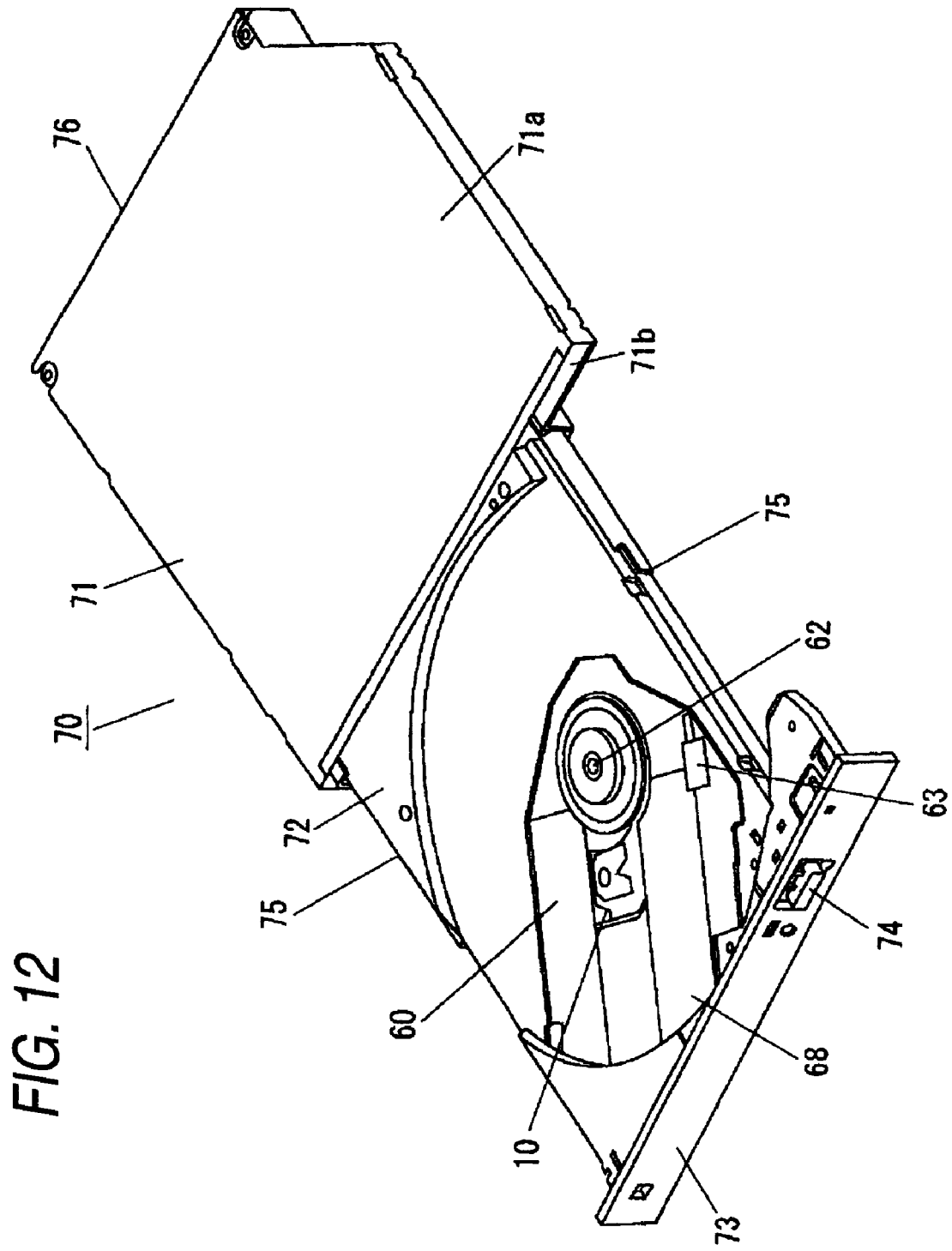
FIG. 12 is a view illustrating the configuration of an optical pickup device according to the third embodiment.

A third embodiment will be described with reference to the accompanying drawings. FIG. 11 is a view illustrating the configuration of an optical pickup module according to the third embodiment, and FIG. 12 is a view illustrating the configuration of an optical pickup device according to the third embodiment.

In FIG. 11, a driving mechanism of an optical disk device 70, which has a rotation driving portion for performing rotation driving of the optical disk 25 and a moving portion serving to make the optical pickup device 10 close to or far from the rotation driving portion, is referred to as an optical pickup module 60. Since a base 61 forms a skeleton of the optical pickup module 60, the optical pickup module 60 is configured such that respective constituent components are arranged directly or indirectly on the base 61.

The rotation driving portion includes a spindle motor 62 having a turntable 62a on which the optical disk 25 is placed. The spindle motor 62 is fixed to the base 61. The spindle motor 62 generates a rotational driving force to rotate the optical disk 25.

The moving portion includes a feed motor 63, a screw shaft 64, a main shaft 65, and a subshaft 66. The feed motor 63 is fixed to the base 61. The feed motor 63 generates a rotational driving force required when the optical pickup device 10 moves between the inner periphery and outer periphery of the optical disk 25. For example, a stepping motor or a DC motor is used as the feed motor 63. The screw shaft 64 is spirally grooved and is directly connected to the feed motor 63 or connected to the feed motor 63 through several stages of gears. In the third embodiment, the screw shaft 64 is directly connected to the feed motor 63. Each of the main shaft 65 and the subshaft 66 has both ends that are fixed to the base 61 through a supporting member. The main shaft 65 and the subshaft 66 movably support the optical pickup device 10 in the radial direction of the optical disk 25. The optical pickup device 10 includes a rack 67 having guide teeth which engage grooves of the screw shaft 64. Since the rack 67 converts the rotational driving force of the feed motor 63 transmitted to the screw shaft 64 into a linear driving force, the optical pickup device 10 can move between the inner periphery and outer periphery of the optical disk 25.

In addition, the rotation driving portion is not limited to having the configuration described in the third embodiment as long as it can rotate the optical disk 25 at a predetermined number of rotations. In addition, the moving portion is not limited to having the configuration described in the third embodiment as long as it can move the optical pickup device 10 to a predetermined position between the inner periphery and outer periphery of the optical disk 25.

The optical pickup device 10 has been explained in the first embodiment or the second embodiment and is obtained by attaching a cover 46 in the configuration shown in FIG. 2. The optical pickup device 10 includes the light source 11, the optical receiver 18, and the astigmatism-generating element 31 or the astigmatism-generating element 50. The light source 11 emits a laser beam having the wavelength λ1 and a laser beam having the wavelength λ2, which is longer than the wavelength λ1, toward the optical disk 25 from the adjacent positions. The optical receiver 18 detects light reflected from the optical disk 25. The astigmatism-generating element 31 or the astigmatism-generating element 50 generates light used for focus control in a condition where a focusing position on one of the two perpendicular cross sections including the optical axis of the reflected light of the optical disk 25 is located ahead of the optical receiver 18 and a focusing position on the other cross section is located behind the optical receiver 18. By using a Fresnel mirror 31*a* configured to include a plurality of orbicular band shaped reflecting mirrors, the astigmatism-generating element 31 is formed. In addition, the astigmatism-generating element 50 is the Fresnel mirror 50*a* configured to include a plurality of orbicular band shaped reflecting mirrors. In addition, it is characterized that the level difference 31*b* or the level difference 50*b* of the orbicular band shaped reflecting mirrors adjacent to each other is distributed in a range from the depth of substantially (natural number/2) times of the wavelength $\lambda 1$ to the depth of substantially (natural number/2) times of the wavelength $\lambda 2$, from a region where the light with the wavelength $\lambda 1$ is incident toward a region where the light with the wavelength $\lambda 2$ is incident.

In the optical pickup device 10 according to the third embodiment, in the case where the depth d of the level difference 31*b* or level difference 50*b* is (natural number/2) times of a wavelength of incident light, it is most preferable that a component of diffracted light caused by the level difference 31*b* or the level difference 50*b* be eliminated for phase matching. Since the light with the wavelength $\lambda 1$ and the light with the wavelength $\lambda 2$ are emitted from the different positions in the light source 11, the light with the wavelength $\lambda 1$ and the light with the wavelength $\lambda 2$ are incident on the different positions also in the Fresnel mirror 31*a* or the Fresnel mirror 50*a* with a certain distribution. Therefore, the phase matching can be realized to some extent for both the light with the wavelength $\lambda 1$ and the light with the wavelength $\lambda 2$ by distributing the depth d of the level difference 31*b* or level difference 50*b* in a range from the depth of substantially (natural number/2) times of the wavelength $\lambda 1$ to the depth of substantially (natural number/2) times of the wavelength $\lambda 2$, from a region where the light with the wavelength $\lambda 1$ is incident toward a region where the light with the wavelength $\lambda 2$ is incident.

For this reason, since a component of diffracted light caused by the level difference 31*b* or the level difference 50*b* is reduced for both the light with the wavelength $\lambda 1$ and the light with the wavelength $\lambda 2$, stray light on the optical receiver 18 can be suppressed. As a result, the tracking control or the focus control is stabilized. In addition, since the Fresnel mirror 31*a* is used as the astigmatism-generating element 31 or the Fresnel mirror 50*a* is used as the astigmatism-generating element 50, miniaturization can be realized. Accordingly, miniaturization and stabilized recording and reproduction are possible.

Furthermore, in the astigmatism-generating element 50, the reflected light incident on the Fresnel mirror 50*a* is converging light and the Fresnel mirror 50*a* is disposed to be inclined at a predetermined angle with respect to the converging light. Furthermore, the depth d of the level difference 50*b* can be corrected to be deeper as a region where reflected light is incident is at a larger incident angle $\theta i$ and to be shallower as a region where reflected light is incident is at a smaller incident angle $\theta i$.

The depth d of the level difference 50*b* for phase matching becomes large as the incident angle $\theta i$ increases, and the depth d of the level difference 50*b* for phase matching becomes small as the incident angle $\theta i$ decreases. By correcting this the phase matching can be performed more correctly. Accordingly, the component of diffracted light caused by the level difference 50*b* is reduced. As a result, since the stray light on the optical receiver 18 can be more suppressed, the tracking control or the focus control can be stabilized.

An adjusting mechanism that forms a supporting member adjusts the inclination of the main shaft 65 and subshaft 66 so that a laser beam emitted from the objective lens 17 of the optical pickup device 10 is incident on the optical disk 25 at a right angle.

Referring to FIG. 12, a housing 71 of the optical disk device 70 is formed by combining an upper housing 71*a* and a lower housing 71*b* and fixing them to each other with screws or the like. A tray 72 is retractably provided with respect to the housing 71. In the tray 72, the optical pickup module 60 provided with a cover 68 is disposed from a bottom surface of the tray. The cover 68 has an opening that exposes the objective lens 17 of the optical pickup device 10 and the turntable 62*a* of the spindle motor 62. Furthermore, in the third embodiment, the feed motor 63 is also exposed such that the thickness of the optical pickup module 60 becomes small. The tray 72 has an opening that exposes the objective lens 17, the turntable 62*a*, and at least a part of the cover 68. A bezel 73 is provided on a front surface of the tray 72 and is adapted to block the entrance of the tray 72 when the tray 72 is accommodated within the housing 71. The bezel 73 is provided with an eject switch 74. By pushing the eject switch 74, engagement between the housing 71 and the tray 72 is released, which makes it possible for the tray 72 to appear from the housing 71. Rails 75 are slidably attached to both opposite sides of the tray 72 and the housing 71. A circuit board (not shown) is provided inside the housing 71 or the tray 72. ICs of a signal processing system, a power supply circuit, and the like are mounted on the circuit board. An external connector 76 is connected to a power supply/signal line provided in an electronic apparatus such as a computer. In addition, by way of the external connector 76, power is supplied to the optical disk device 70, an electrical signal from the outside is led into the optical disk device 70, or an electrical signal generated in the optical disk device 70 is transmitted to an electronic apparatus.

Figure 13:
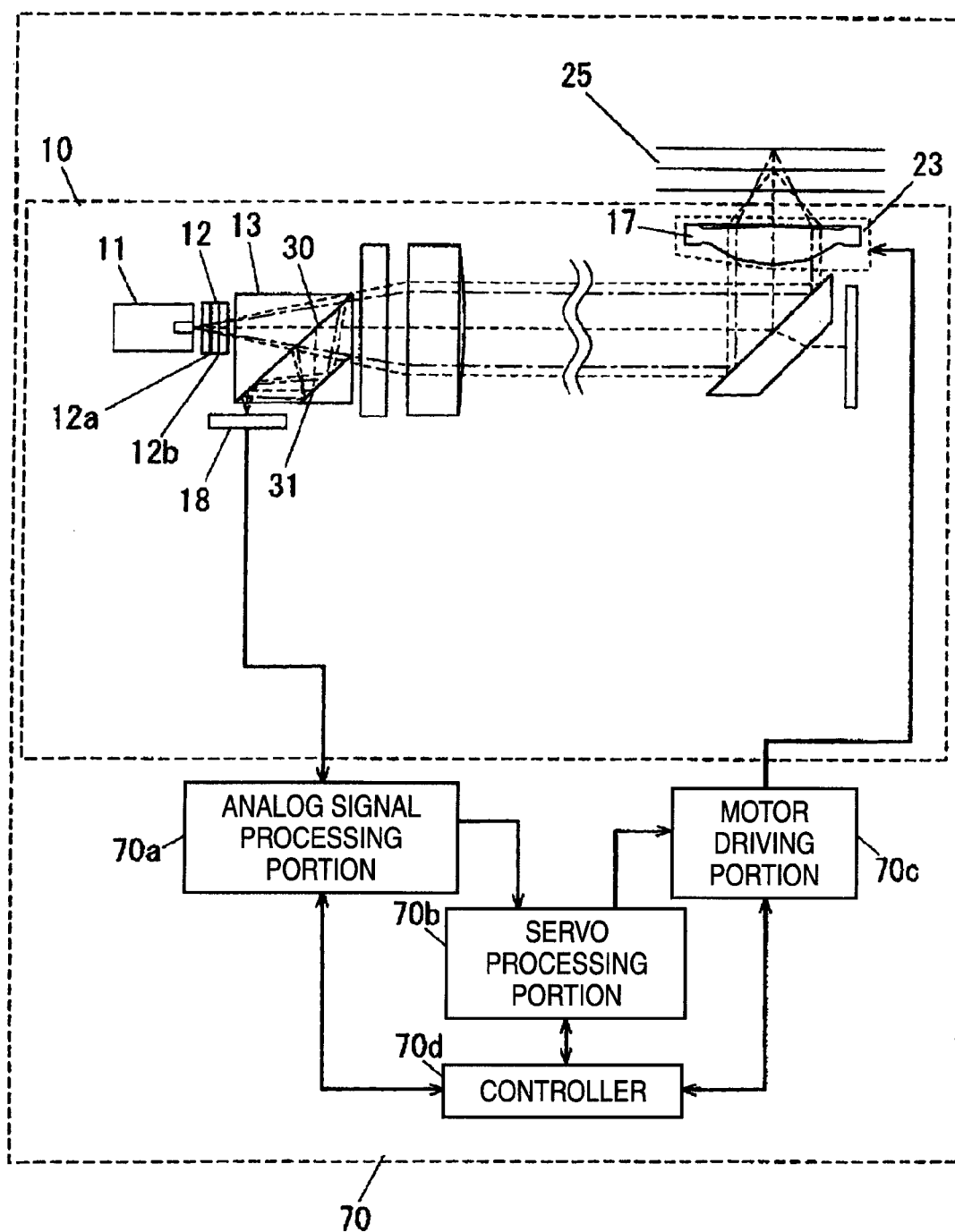
FIG. 13 is a view illustrating the flow of a servo control of the optical pickup device according to the third embodiment.
Figure 14:
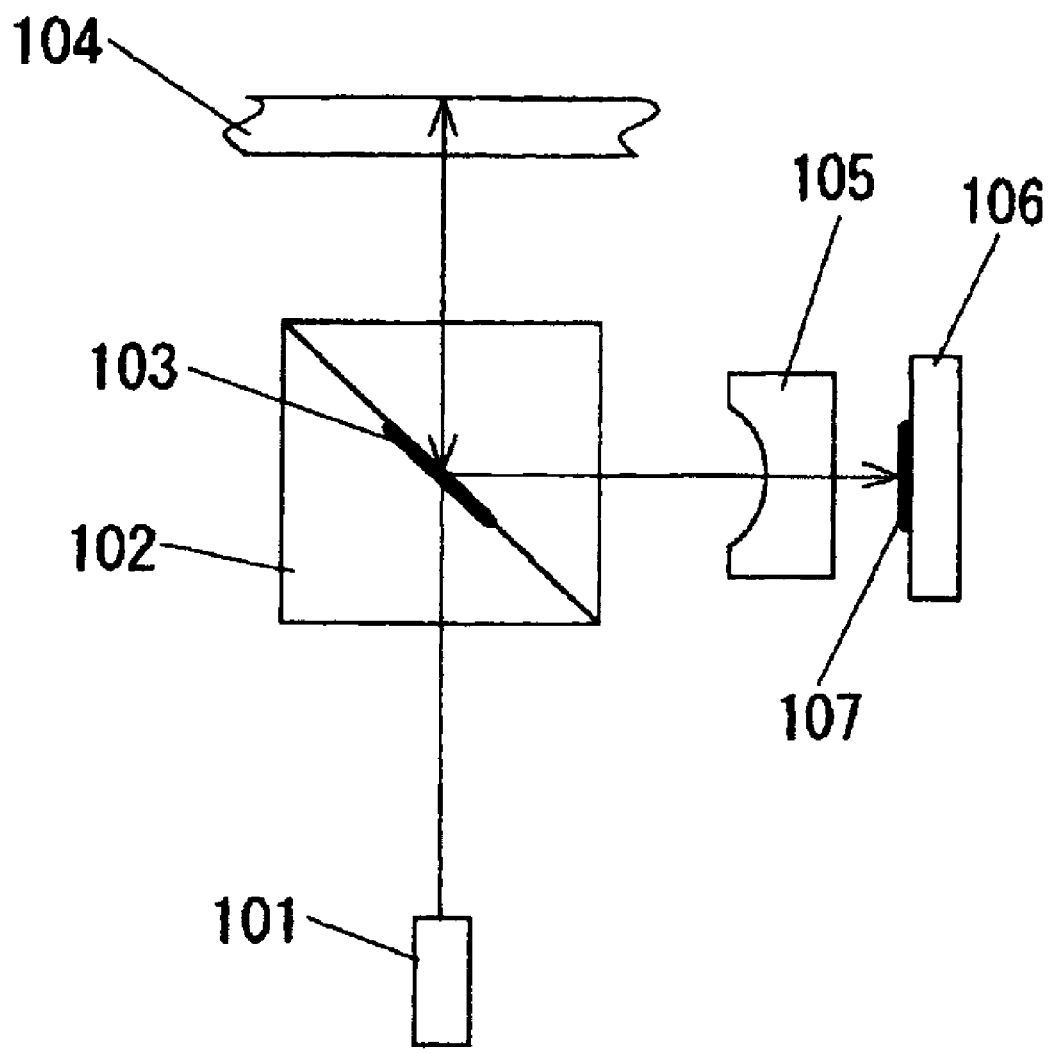
FIG. 14 is a view illustrating the configuration of main parts in an optical system of a known optical pickup device.
Figure 15A:
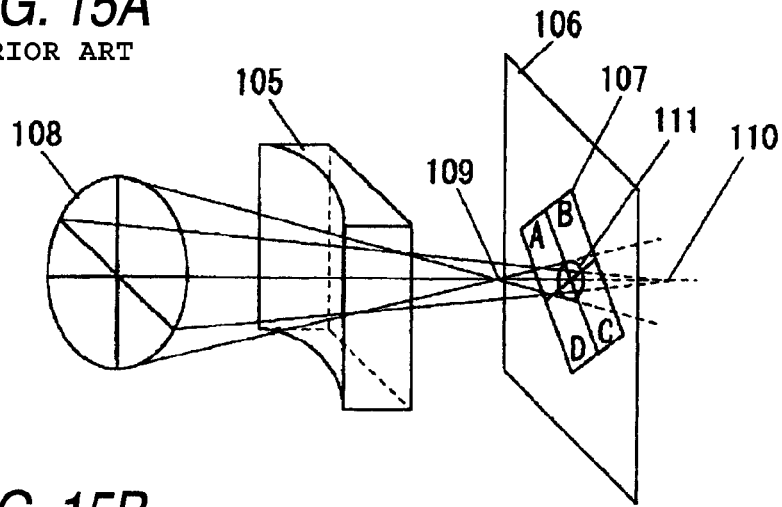
FIG. 15A is an explanatory view illustrating a detection lens.
Figure 15B:
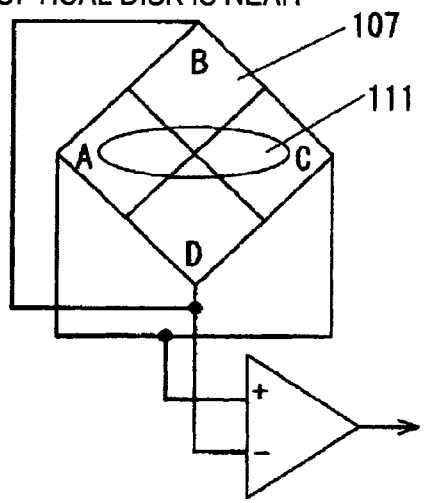
FIG. 15B is a view illustrating a state of a spot when an optical disk is near.
Figure 15C:
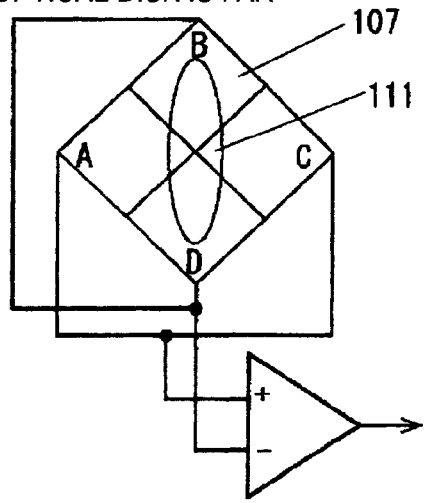
FIG. 15C is a view illustrating a state of a spot when an optical disk is far.
Figure 16A:
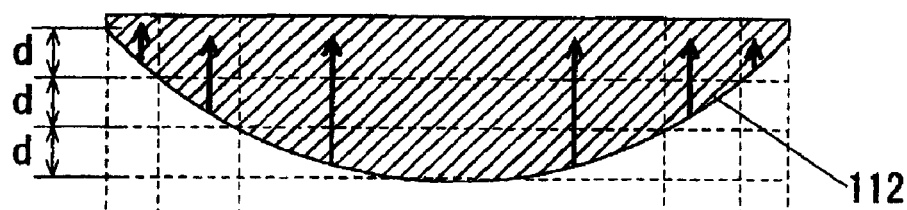
FIG. 16A is a cross-sectional view illustrating a normal lens.
Figure 16B:
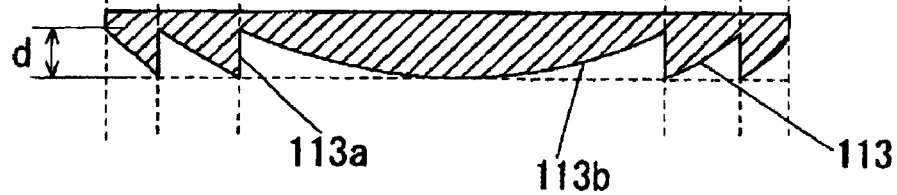
FIG. 16B is a cross-sectional view illustrating a Fresnel lens.

FIG. 13 is a view illustrating the flow of a servo control of the optical pickup device according to the third embodiment. The flow of the focus control and tracking control of the optical pickup device 10 will be described. A laser beam for DVD having the wavelength $\lambda 1$ and a laser beam for CD having the wavelength $\lambda 2$, which are emitted from the light source 11, are separated into light beams used for the tracking control by the first diffraction grating 12*a* and the second diffraction grating 12*b* of the diffraction element 12 and are then incident on the optical disk 25. Laser beams reflected from the optical disk 25 are separated by the beam splitter 30 of the integrated prism 13, become laser beams having different focal distances on two perpendicular cross sections including an optical axis by the astigmatism-generating element 31, and are then incident on the optical receiver 18. The laser beams transmitted through the astigmatism-generating element 31 are used for focus control. The laser beams incident on the optical receiver 18 are converted into an electric signal for focus control in DVD, an electric signal for focus control in CD, an electric signal for tracking control in DVD, and an electric signal for tracing control in CD and are then transmitted to an analog signal processing portion 70*a* provided on the circuit board (not shown) of the main body of the optical disk device 70.

The analog signal processing portion 70*a* performs operation and band processing on input signals and outputs the processed signals to a servo processing portion 70*b*. The servo processing portion 70*b* generates the focus error signal FES and the tracking error signal TES on the basis of the signals from the analog signal processing portion 70a and outputs the signals to a motor driving portion 70c. The motor driving portion 70c generates a current for driving the actuator 23 in which the objective lens 17 is mounted on the basis of the focus error signal FES and the tracking error signal TES that have been input. As a result, a control is made such that deviation of a focal point of beams condensed on the optical disk 25 and deviation from a track are minimized. Generally, the analog signal processing portion 70a can generate signals representative of parameters associated with the light generated by the astigmatism-generating element. The servo processing portion 70b can generate focus control signals and error control signals based upon the signals generated by the analog signal processing portion 70a.

In addition, signals transmitted from the analog signal processing portion 70a, the servo processing portion 70b, and the motor driving portion 70c are input to a controller 70d. The controller 70d controls each of the portions by performing operation processing on the signals, transmitting a result (signal) of the operation processing to each portion, and making each portion execute driving and processing.

As described above, the optical disk device 70 according to the third embodiment includes the optical pickup device 10 according to the first embodiment or the second embodiment. In the case where the depth d of the level difference 31b or level difference 50b is (natural number/2) times of a wavelength of incident light, it is the most preferable that a component of diffracted light caused by the level difference 31b or the level difference 50b be eliminated for phase matching. Since the light with the wavelength $\lambda 1$ and the light with the wavelength $\lambda 2$ are emitted from the different positions in the light source 11, the light with the wavelength $\lambda 1$ and the light with the wavelength $\lambda 2$ are incident on the different positions also in the Fresnel mirror 31a or the Fresnel mirror 50a with a certain distribution. Therefore, the phase matching can be realized to some extent for both the light with the wavelength $\lambda 1$ and the light with the wavelength $\lambda 2$ by distributing the depth d of the level difference 31b or level difference 50b in a range from the depth of substantially (natural number/2) times of the wavelength $\lambda 1$ to the depth of substantially (natural number/2) times of the wavelength $\lambda 2$, from a region where the light with the wavelength $\lambda 1$ is incident toward a region where the light with the wavelength $\lambda 2$ is incident.

For this reason, since a component of diffracted light caused by the level difference 31b or the level difference 50b is reduced for both the light with the wavelength $\lambda 1$ and the light with the wavelength $\lambda 2$, stray light on the optical receiver 18 can be suppressed. As a result, the tracking control or the focus control is stabilized. In addition, since the Fresnel mirror 31a is used as the astigmatism-generating element 31 or the Fresnel mirror 50a is used as the astigmatism-generating element 50, miniaturization can be realized. Accordingly, miniaturization and stabilized recording and reproduction are possible.

This application based upon and claims the benefit of priority of Japanese Patent Application No 2007-206579 filed on Aug. 8, 2007, the contents of which are incorporated herein by reference in its entirety.

What is claimed is:

1. An optical pickup device, comprising:
   a light source that emits light with a wavelength $\lambda 1$ and light with a wavelength $\lambda 2$ that is longer than the wavelength $\lambda 1$, to an optical disk from adjacent positions;
   an optical receiver that detects light reflected from the optical disk; and
   an astigmatism-generating element that generates light used for focus control in a condition that a focusing position on one of two perpendicular cross sections including an optical axis of the light reflected from the optical disk is located ahead of the optical receiver and a focusing position on the other cross section is located behind the optical receiver,
   wherein the astigmatism-generating element is a Fresnel mirror configured to include a plurality of reflecting mirrors;
   a level difference between the reflecting mirrors that are adjacent to each other is a value in a range from a depth of substantially (natural number/2) times the wavelength $\lambda 1$ to a depth of substantially (natural number/2) times the wavelength $\lambda 2$, from a region where the light with the wavelength $\lambda 1$ is incident toward a region where the light with the wavelength $\lambda 2$ is incident;
   the reflected light incident on the Fresnel mirror is converging light;
   the Fresnel mirror is disposed to be inclined at a predetermined angle with respect to the converging light;
   the level difference is corrected to be deeper as a region where the reflected light is incident is at a larger incident angle and to be shallower as a region where the reflected light is incident is at a smaller incident angle; and
   the light with the wavelength $\lambda 1$ is incident on a side of the Fresnel mirror on which the reflected light is incident at a larger incident angle and the light with the wavelength $\lambda 2$ is incident on a side of the Fresnel mirror on which the reflected light is incident at a smaller incident angle.

2. The optical pickup device according to claim 1, wherein the light with the wavelength $\lambda 1$ is light emitted toward one of a DVD and a Blue-ray disc, and the light with the wavelength $\lambda 2$ is light emitted toward a CD.

3. The optical pickup device according to claim 1, wherein the depth of substantially (natural number/2) times the wavelength $\lambda 1$ is a depth of a half of the wavelength $\lambda 1$, and
   the depth of substantially (natural number/2) times the wavelength $\lambda 2$ is a depth of a half of the wavelength $\lambda 2$.

4. The optical pickup device according to claim 1, wherein each of the reflecting mirrors has a curved shape.

5. The optical pickup device according to claim 1, wherein each of the reflecting mirrors has an orbicular band shape.

6. An optical pickup device, comprising:
   a light source that emits light with a wavelength $\lambda 1$ and light with a wavelength $\lambda 2$ that is longer than the wavelength $\lambda 1$, to an optical disk from adjacent positions;
   an optical receiver that detects light reflected from the optical disk; and
   an astigmatism-generating element that generates light used for focus control in a condition that a focusing position on one of two perpendicular cross sections including an optical axis of the light reflected from the optical disk is located ahead of the optical receiver and a focusing position on the other cross section is located behind the optical receiver,
   wherein the astigmatism-generating element is a Fresnel mirror configured to include a plurality of reflecting mirrors;
   a level difference between the reflecting mirrors that are adjacent to each other is a value in a range from a depth of substantially (natural number/2) times the wavelength $\lambda 1$ to a depth of substantially natural number/2 times the wavelength $\lambda 2$ from a region where the light with the wavelength $\lambda 1$ is incident toward a region where the light with the wavelength $\lambda 2$ is incident and
   an overlapping region wherein the region on which the light with the wavelength $\lambda 1$ is incident and the region on which the light with the wavelength $\lambda 2$ is incident overlap each other exists between the region on which the light with the wavelength λ1 is incident and the region on which the light with the wavelength λ2 is incident.

7. An optical pickup device, comprising:
a light source that emits light with a wavelength λ1 and light with a wavelength λ2 that is longer than the wavelength λ1, to an optical disk from adjacent positions;
an optical receiver that detects light reflected from the optical disk; and
an astigmatism-generating element that generates light used for focus control in a condition that a focusing position on one of two perpendicular cross sections including an optical axis of the light reflected from the optical disk is located ahead of the optical receiver and a focusing position on the other cross section is located behind the optical receiver,
wherein the astigmatism-generating element is a Fresnel mirror configured to include a plurality of reflecting mirrors;
a level difference between the reflecting mirrors that are adjacent to each other is a value in a range from a depth of substantially (natural number/2) times the wavelength λ1 to a depth of substantially natural number/2 times the wavelength λ2 from a region where the light with the wavelength λ1 is incident toward a region where the light with the wavelength λ2 is incident; and
an overlapping region on which the light with the wavelength λ1 is incident and the light with the wavelength λ2 is incident overlap each other exists on the reflecting mirrors, wherein the value of the level difference between the reflecting mirrors that are adjacent to each other continuously changes within a range from the depth of substantially (natural number/2) times the wavelength λ1 to the depth of substantially (natural number/2) times the wavelength λ2 within the overlapping region.

8. An optical disk device comprising:
a light source that emits light with a wavelength λ1 and light with a wavelength λ2, which is longer than the wavelength λ1, toward an optical disk from adjacent positions;
a optical receiver that detects light reflected from the optical disk;
an astigmatism-generating element that generates light used for focus control in a condition that a focusing position on one of two perpendicular cross sections including an optical axis of the light reflected from the optical disk is located ahead of the optical receiver and a focusing position on the other cross section is located behind the optical receiver;
a signal processing portion for generating signals representative of parameters associated with the light generated by the astigmatism-generating element; and
a servo processing portion for generating focus control signals and error control signals based upon the signals generated by the signal processing portion,
wherein the astigmatism-generating element is a Fresnel mirror configured to include a plurality of reflecting mirrors,
a level difference between the reflecting mirrors adjacent to each other is a value in a range from a depth of substantially (natural number/2) times the wavelength λ1 to a depth of substantially (natural number/2) times the wavelength λ2, from a region where the light with the wavelength λ1 is incident toward a region where the light with the wavelength λ2 is incident, and the light with the wavelength λ1 is incident on a side of the Fresnel mirror on which the reflected light is incident at a larger incident angle, and the light with the wavelength λ2 is incident on a side of the Fresnel mirror on which the reflected light is incident at a smaller incident angle.

9. The optical disk device according to claim 8, wherein each of the reflecting mirrors has a curved shape.

10. The optical disk device according to claim 8, wherein each of the reflecting mirrors has an orbicular band shape.

11. The optical disk device according to claim 8, wherein:
the reflected light incident on the Fresnel mirror is converging light;
the Fresnel mirror is disposed to be inclined at a predetermined angle with respect to the converging light; and
the level difference is corrected to be deeper as a region where the reflected light is incident is at a larger incident angle and to be shallower as a region where the reflected light is incident is at a smaller incident angle.

12. An optical disk device comprising:
a light source that emits light with a wavelength λ1 and light with a wavelength λ2 which is longer than the wavelength λ1, toward an optical disk from adjacent positions;
a optical receiver that detects light reflected from the optical disk;
an astigmatism-generating element that generates light used for focus control in a condition that a focusing position on one of two perpendicular cross sections including an optical axis of the light reflected from the optical disk is located ahead of the optical receiver and a focusing position on the other cross section is located behind the optical receiver;
a signal processing portion for generating signals representative of parameters associated with the light generated by the astigmatism-generating element; and
a servo processing portion for generating focus control signals and error control signals based upon the signals generated by the signal processing portion,
wherein the astigmatism-generating element is a Fresnel mirror configured to include a plurality of reflecting mirrors,
a level difference between the reflecting mirrors adjacent to each other is a value in a range from a depth of substantially (natural number/2) times the wavelength λ1 to a depth of substantially natural number/2 times the wavelength λ2 from a region where the light with the wavelength λ1 is incident toward a region where the light with the wavelength λ2 is incident, and
an overlapping region on which the light with the wavelength λ1 is incident and the light with the wavelength λ2 is incident overlap each other exists on the reflecting mirrors, wherein the value of the level difference between the reflecting mirrors that are adjacent to each other continuously changes within a range from the depth of substantially (natural number/2) times the wavelength λ1 to the depth of substantially (natural number/2) times the wavelength λ2 within the overlapping region.

13. A Fresnel mirror for an optical pickup device, the Fresnel mirror configured to receive reflected light having a first wavelength and reflected light having a second wavelength that is longer than the first wavelength at adjacent positions, the Fresnel mirror comprising:
a plurality of reflecting mirrors, wherein a level difference between the reflecting mirrors adjacent to each other is a value in a range from a depth of substantially (natural number/2) times the first wavelength to a depth of substantially (natural number/2) times the second wavelength, from a region where the light with the first wavelength is received toward a region where the light with the second wavelength is received, the reflected light is converging light, and the Fresnel mirror is disposed to be inclined at a predetermined angle with respect to the converging light, and the level difference is larger in regions where the reflected light is received at an angle greater than the predetermined angle and is shallower in regions where the reflected light is received at an angle less than the predetermined angle.

14. The Fresnel mirror according to claim 13, wherein the value of the level difference continuously changes from the depth of substantially (natural number/2) times the first wavelength to the depth of substantially (natural number/2) times the second wavelength from the region where the light with the first wavelength is received toward the region where the light with the second wavelength is received.

15. The Fresnel mirror according to claim 13, wherein the light with the first wavelength is light reflected from a Blue-ray disc.

* * * * *